US008676671B2

(12) United States Patent
Willoughby

(10) Patent No.: US 8,676,671 B2
(45) Date of Patent: Mar. 18, 2014

(54) SYSTEMS AND METHODS FOR APPLICATION PROGRAMMING INTERFACES FOR SHIPPING SERVICES

(75) Inventor: Stuart Willoughby, Oakton, VA (US)

(73) Assignee: United States Postal Service, Washington, DC (US)

( * ) Notice: Subject to any disclaimer, the term of this patent is extended or adjusted under 35 U.S.C. 154(b) by 351 days.

(21) Appl. No.: 12/314,136

(22) Filed: Dec. 4, 2008

(65) Prior Publication Data

US 2009/0094082 A1 Apr. 9, 2009

Related U.S. Application Data

(62) Division of application No. 10/344,992, filed as application No. PCT/US01/26656 on Aug. 27, 2001, now abandoned.

(60) Provisional application No. 60/227,903, filed on Aug. 25, 2000.

(51) Int. Cl.
*G06Q 10/00* (2012.01)
*G06F 17/00* (2006.01)

(52) U.S. Cl.
USPC .............................. 705/28; 705/7.13; 715/239

(58) Field of Classification Search
None
See application file for complete search history.

(56) References Cited

U.S. PATENT DOCUMENTS

| | | | | |
|---|---|---|---|---|
| 4,742,771 A | * | 5/1988 | Heilig | 101/407.1 |
| 5,485,369 A | * | 1/1996 | Nicholls et al. | 705/7.13 |
| 5,819,092 A | * | 10/1998 | Ferguson et al. | 717/113 |
| 5,967,558 A | * | 10/1999 | Petkovsek | 283/61 |
| 6,321,214 B1 | | 11/2001 | Thiel | |
| 6,463,420 B1 | * | 10/2002 | Guidice et al. | 705/28 |
| 6,470,327 B1 | | 10/2002 | Carroll et al. | |
| 6,510,434 B1 | * | 1/2003 | Anderson et al. | 1/1 |
| 6,564,251 B2 | * | 5/2003 | Katariya et al. | 709/214 |
| 6,993,715 B2 | * | 1/2006 | Deen et al. | 715/239 |
| 7,028,306 B2 | * | 4/2006 | Boloker et al. | 719/310 |
| 7,035,832 B1 | | 4/2006 | Kara | |
| 7,117,170 B1 | * | 10/2006 | Bennett et al. | 705/34 |
| 7,149,726 B1 | * | 12/2006 | Lingle et al. | 705/411 |
| 7,222,165 B1 | * | 5/2007 | Ellis et al. | 709/223 |

* cited by examiner

*Primary Examiner* — Ryan Zeender
*Assistant Examiner* — Dana Amsdell
(74) *Attorney, Agent, or Firm* — Finnegan, Henderson, Farabow, Garrett & Dunner LLP

(57) ABSTRACT

Systems and methods provide shipping services information. In one implementation, a method is provided in which an e-commerce server receives a request for shipping information from an end-user. The e-commerce server generates an extensible markup language (XML) request based on the requested shipping information and sends the XML request to an application programming interface (API) server. The API server determines, based on the XML request, one of a plurality of API modules stored in the API server to process the XML request and generates an XML response based on data included in the XML request. The API server sends the XML response to the e-commerce server, which sends the XML response to the end-user.

26 Claims, 18 Drawing Sheets

SYSTEMS AND METHODS FOR APPLICATION PROGRAMMING INTERFACES FOR SHIPPING SERVICES

CROSS REFERENCE TO RELATED APPLICATION

This application is a divisional of U.S. patent application Ser. No. 10/344,992, filed Dec. 9, 2003, now abandoned which is a national stage filing under 35 U.S.C. §371 of PCT International Application No. PCT/US01/26656, filed Aug. 27, 2001, and claims priority to U.S. Provisional Patent Application No. 60/227,903, filed Aug. 25, 2000, by Stuart Willoughby and entitled SYSTEMS AND METHODS FOR APPLICATION PROGRAMMING INTERFACES FOR SHIPPING SERVICES, the entire disclosure of which is all of which are incorporated herein by reference.

DESCRIPTION OF THE INVENTION

1. Field of the Invention

This invention relates to providing an internet customer with information relative to shipping services using application programming interfaces ("API's" or "Web Tools API") supplied by the United States Postal Service ("USPS"). The API's are designed to allow electronic commerce ("e-commerce entities") to generate requests and to send them over the network to servers for access to USPS shipping information. E-commerce entities may include multi-carriers, electronic retailers ("e-tailers"), electronic shopping malls, auction houses, or third party vendors that buy in broker services over a network. The network is preferably the Internet; however, any type of network known to those skilled in the art may be used.

2. Background of the Invention

Currently, a person desiring to send a package to a recipient may take the package to a mailing point where she is provided information about the various shipping options and costs of shipping. The person selects a shipping option, pays the mailer for the cost of shipping, receives a label that is applied to the package, and the package is then placed into a mail stream. One such example of a mail stream is the mail stream provided by the USPS. Alternatively, a person may contact a mailing company. The mailing company provides to the person information about the various shipping options and costs of shipping. The person selects a shipping option, pays the mailing company for the cost of shipping, and gives the package to a mailer associated with the mailing company. The mailer then generates a label and applies it to the package. Thereafter, the mailer places the package into the mail stream. Either way, the person must wait to be informed of the cost of mailing the package and/or wait to pay for the mailing label before the package may be sent.

With the advent of e-commerce, electronic shoppers ("e-shoppers") may make purchases from e-commerce entities over the network. It is advantageous to the e-commerce entities to have e-shoppers to stay on their web sites and buy more items, instead of having to make separate arrangements for receiving information for shipping or returning a purchased item. It is advantageous to the e-shoppers to have the ability to receive shipping labels electronically for application to a packaged item or to request that an e-commerce entity package and ship a purchased item.

It is accordingly an object of an embodiment of the invention to provide e-commerce entities with access to USPS shipping services information. The e-commerce entities may in turn provide such information to e-shoppers, thereby allowing e-shoppers to request and receive information about the various shipping options and the cost of mailing an item. In addition, the e-shoppers may purchase mailing labels, delivery confirmation labels, or request merchandise return labels. The shipping options may include services such as Express Mail®, Priority Mail®, and Parcel Posts™, etc. The shipping services information may include domestic and international postal rates, service standards, addressing information, mailing labels, merchandise return labels, delivery confirmation labels, etc.

This is achieved by providing to e-commerce entities a collection of API's, which provide access to servers having USPS shipping information. The servers may include, for example, one or more USPS servers. These API's may be coded in a language which is independent of operating system and hardware implementation. Preferably, the API's are implemented in Extensible Markup Language ("XML"); however, they are not limited to language and could be written in any programming language known to those skilled in the art.

An e-commerce entity may utilize the API's to make a request to a USPS server over the network for shipping information. For convenience, the USPS server will be referred to herein as the "Web Tools API Server." The Web Tools API server receives the request, generates a response to the request, and sends the response over the network to the e-commerce entity. The response may include the requested shipping information.

SUMMARY OF THE INVENTION

In accordance with the invention, systems and methods are disclosed for providing shipping services information over a network by providing instructions to a first server from a second server which permits the first server to access the shipping services information residing on the second server over the network. The first server receives a request from a client for the shipping services information residing on the second server. Thereafter, the second server provides the requested shipping services information from the second server to the client through the first server.

It is to be understood that both the foregoing general description and the following detailed description are exemplary and explanatory only and are not restrictive of the invention, as claimed.

The accompanying drawings, which are incorporated in and constitute a part of this specification, illustrate embodiments of the invention and together with the description, serve to explain the principles of the invention.

DESCRIPTION OF THE EMBODIMENTS

Reference will now be made in detail to an exemplary embodiment of the invention, an example of which is illustrated in the accompanying drawings. Wherever possible, the same reference numbers will be used throughout the drawings to refer to the same or like parts. For convenience, an e-shopper will be described herein as an "end-user."

Figure 1:
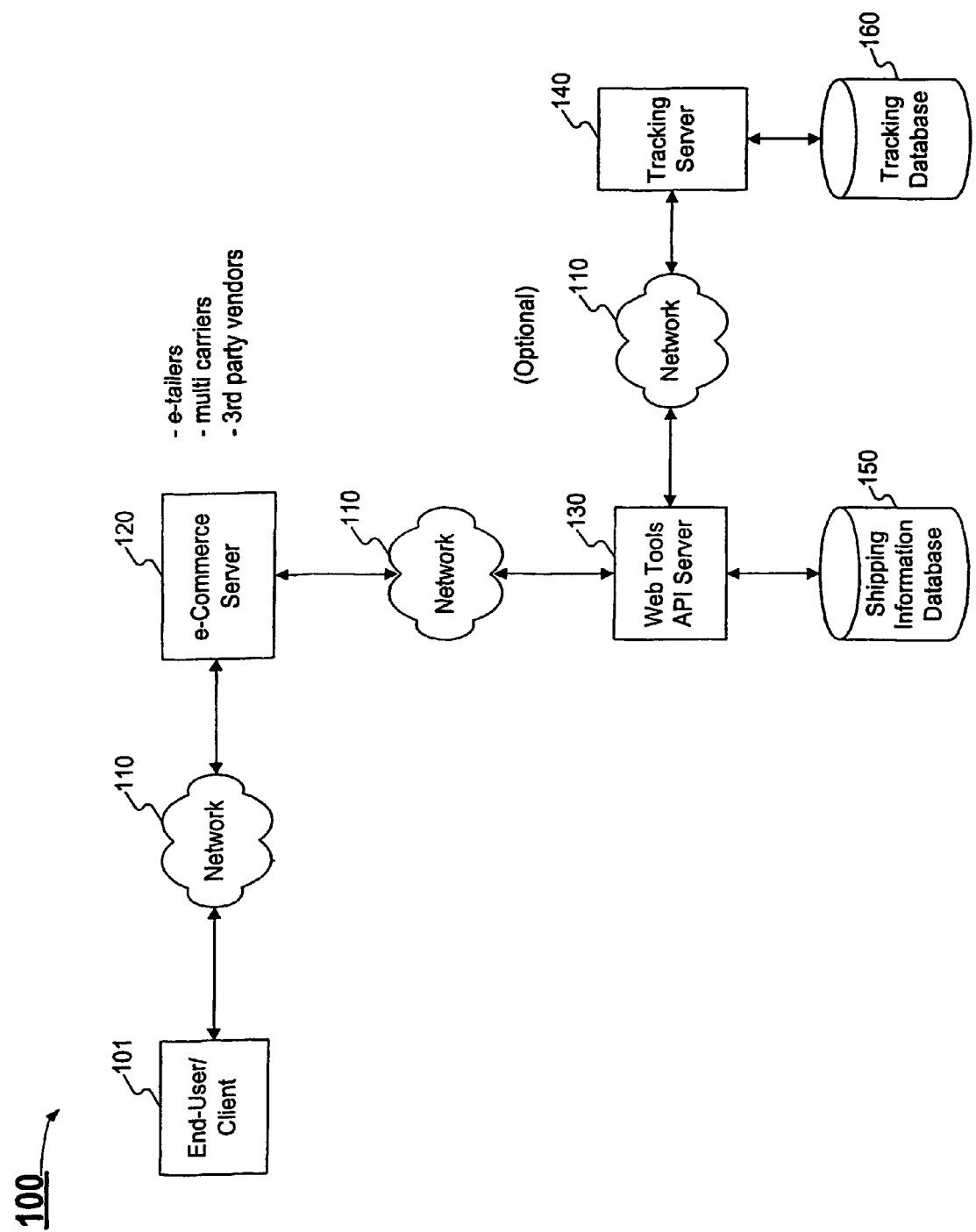
FIG. 1 is a block diagram of a system consistent with the present invention.

FIG. 1 is a block diagram of an exemplary system with which the invention may be implemented. System 100 may include a plurality of end-user/client systems 101, a network 110, a plurality of e-commerce server systems 120, one or more Web Tools API server systems 130, and one or more shipping information databases 150. In addition, system 100 may optionally include one or more tracking servers 140 for tracking the delivery status of mailed items in a mail stream, and one or more tracking databases 160. Network 110 may include, for example, a Local Area Network (LAN), a Wide Area Network (WAN), a wireless network, the Internet, an intranet, and/or any other network or communication medium known to one of ordinary skill in the relevant art.

Figure 2:
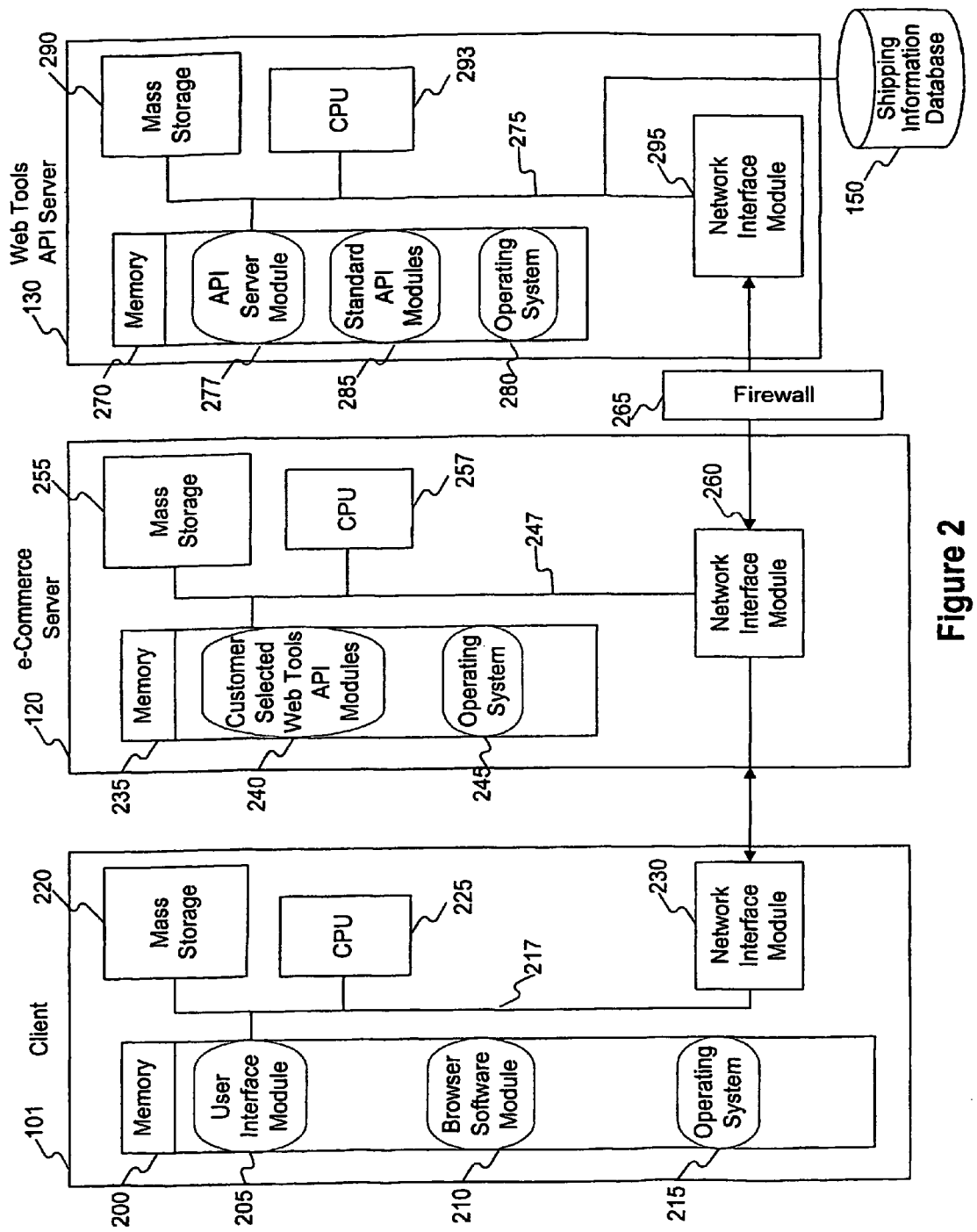
FIG. 2 is a block diagram of an end-user/client system, e-commerce server system, and Web Tools API server system consistent with the present invention.

FIG. 2 is a block diagram of an end-user/client system 101, e-commerce server system 120, and Web Tools API server system 130 consistent with the present invention. End-user/client system 101 may include a processor ("CPU") 225, which connects over a bus 217 to a memory 200, a mass storage 220, and a network interface module 230. Memory 200 may include an user interface module 205, a browser software module 210, and an operating system 215.

Operation of end-user/client system 101 is generally controlled and coordinated by operating system software 215. Operating system 215 controls allocation of system resources and performs tasks, such as memory management, process scheduling, networking, and services, among other things.

Mass storage 220 may include a computer-readable medium, such as a disk drive and a compact disc ("CD") drive or a read/write CD drive. From the CD drive or the read/write CD drive, software and data may be loaded onto the disk drive, which may then be copied into memory 200. Similarly, software and data in memory 200 may be copied onto the disk drive, which may then be loaded onto a read/write CD drive.

Network interface module 230 may include hardware and software for sending and receiving data over network 110. End-user/client system 101 may communicate with an e-commerce server system 120 over network 110 through network interface module 230.

E-commerce server system 120 may include a processor ("CPU") 257, which connects over a bus 247 to a memory 235, a mass storage 255, and a network interface module 260. Memory 235 may include one or more API modules 240 in the Web Tools API suite integrated with an e-commerce entity's application software, and operating system 245, each of which will be described below in detail.

Operation of e-commerce server system 120 is generally controlled and coordinated by operating system software 245. Operating system 245 controls allocation of system resources and performs tasks, such as memory management, process scheduling, networking, and services, among other things.

Mass storage 255 may include a computer-readable medium, such as a disk drive and a CD drive or a read/write CD drive. From the CD drive or the read/write CD drive, software and data may be loaded onto the disk drive, which may then be copied into memory 235. Similarly, software and data in memory 235 may be copied onto the disk drive, which may then be loaded onto a read/write CD drive.

Network interface module 260 may include hardware and software for sending and receiving data over network 110. E-commerce server system 120 may communicate with a plurality of end-user/client systems 101 and/or one or more Web Tools API server systems 130 over network 110 through network interface module 260. Alternatively, e-commerce server system 120 may communicate with one or more Web Tools API server systems 130 over network 110 through a firewall 265 via network interface module 260.

Web Tools API server system 130 may include a processor ("CPU") 293, which connects over a bus 275 to a memory 270, a mass storage 290, a network interface module 295, and one or more shipping information databases 150. Memory 270 may include API server module 277, standard API modules 285, and operating system 280, each of which will be described below in detail.

Operation of Web Tools API server system 130 is generally controlled and coordinated by operating system software 280. Operating system 280 controls allocation of system resources and performs tasks, such as memory management, process scheduling, networking, and services, among other things.

Mass storage 290 may include a computer-readable medium, such as a disk drive and a CD drive or a read/write CD drive. From the CD drive or the read/write CD drive, software and data may be loaded onto the disk drive, which may then be copied into memory 270. Similarly, software and data in memory 270 may be copied onto the disk drive, which may then be loaded onto a read/write CD drive.

Network interface module 295 may include hardware and software for sending and receiving data over network 110. Web Tools API server system 130 may communicate with a plurality of e-commerce server systems 120 over network 110 through network interface module 295. Alternatively, Web Tools API server system 130 may communicate with a plurality of e-commerce server systems 120 over network 110 through a firewall 265 via network interface module 295. In addition, the Web Tools API server system 130 may send and/or receive shipping information to/from one or more shipping information databases 150. Optionally, the Web Tools API server system 130 may communicate with one or more tracking servers 140 over network 110 through network interface module 295 to request and receive information from one or more tracking databases 160.

In one example, an e-commerce entity may make a request to an API provider for one or more API modules in the Web Tools API suite. The API provider may include, for example, the USPS. The e-commerce entity registers with the API provider and receives a username and password for connecting to a Web Tools API Server 130. The API provider may send the requested API modules to the e-commerce entity by any known delivery method. For example, the API provider may send the requested API modules by an email, or by placing the API modules on a CD or floppy disk and mailing them to the e-commerce entity. In another example, the API provider may access an API server module 277 on a Web Tools API server 130 to send the requested API modules over a network 110 to an e-commerce server 120 specified by the e-commerce entity. Thereafter, the e-commerce entity may integrate the API modules with its application software on one or more e-commerce servers 120 to generate Extensible Markup Language ("XML") requests to the Web Tools API server 130 for shipping information. The API modules may provide for processing multiple requests within a single transaction.

Once the API modules are integrated with application software of an e-commerce server 120, an end-user 101 may access the e-commerce server 120 over a network 110 through a client system 101 and make a request for information, for example, a request for a merchandise return label. E-commerce server 120 generates an XML request based on the request from the end-user. Thereafter, ecommerce server 120 sends the request to the Web Tools API server 130. Web Tools API server 130 receives the request and calls an appropriate standard API module 285 to processes the request. Once the request is processed, Web Tools API server 130 sends an XML response back to e-commerce server 120. E-commerce server 120 may send the XML response back to the end-user at client system 101 through network 110. If e-commerce server 120 detects an error condition in the XML response, it may notify the end-user of the error condition. Otherwise, e-commerce server 120 retrieves the requested information from the XML response and sends it to the end-user, in this example, the merchandise return label is sent to the end-user.

Figure 3:
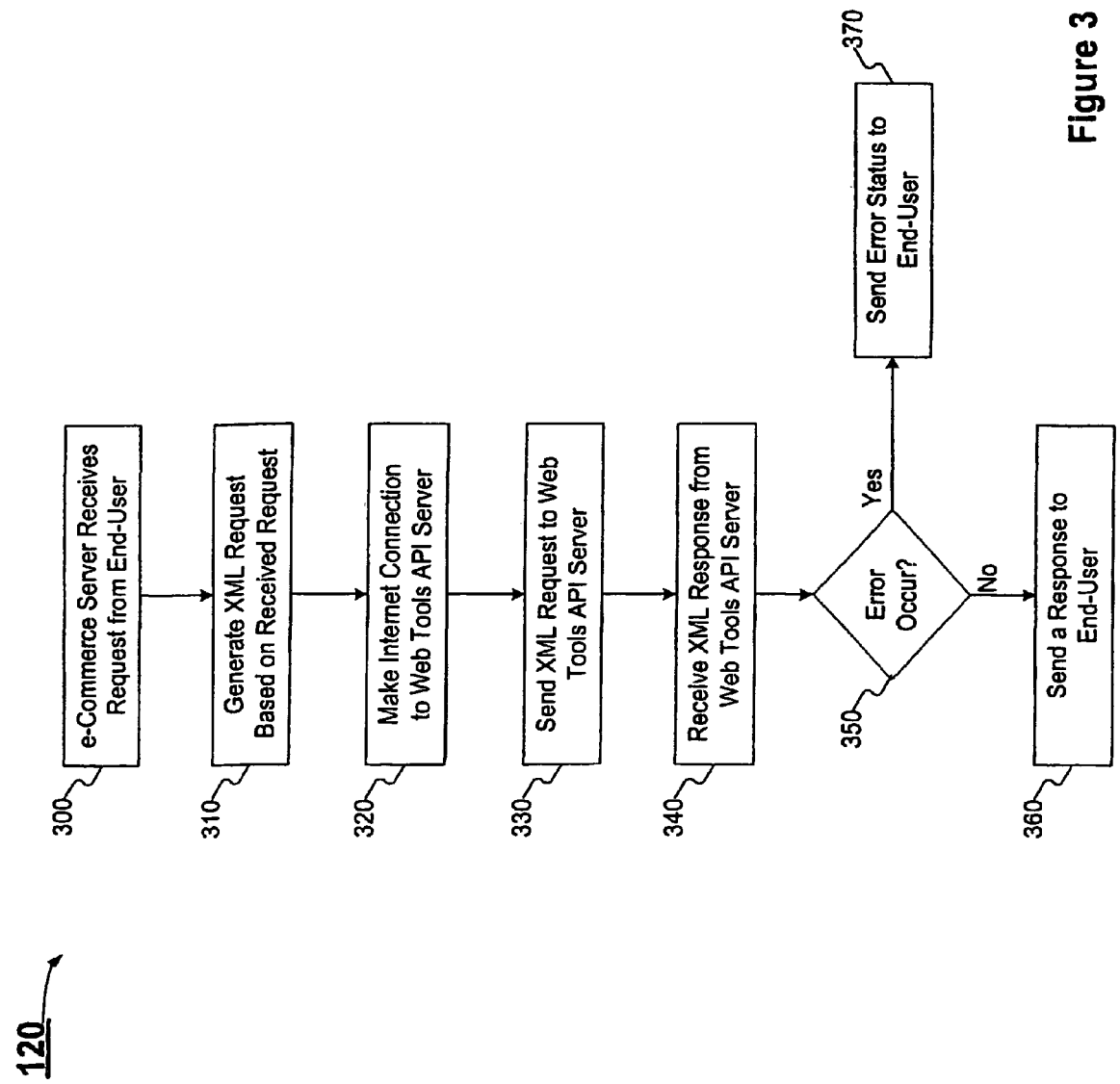
FIG. 3 is a flowchart showing a method for providing shipping services information over a network.

FIG. 3 is a flowchart showing a method for providing shipping services information over a network. The discussion that follows is a more detailed description of the processing performed by e-commerce server 120 and Web Tools API server 130. An e-commerce server 120 receives a request from an end-user through a client system 101 (stage 300). E-commerce server 120 generates an XML request based on the request from the end-user (stage 310). The XML request may include a tag that specifies a particular API in the standard API modules 285 to use in processing the request, and one or more tags that represent information relevant for processing the request. The format of an XML request for each API is described below in detail. In addition, the USPS may provide to an e-commerce entity example integration source code that may be used by an e-commerce server 120 to generate XML requests.

Next, e-commerce server 120 may make a network connection to a Web Tools API server 130 (stage 320). The USPS may provide to an e-commerce entity example integration source code that may be used by an e-commerce server 120 to connect to a Web Tools API server 130.

Thereafter, e-commerce server 120 sends the XML request to a Web Tools API server 130 through network 110 (stage 330). The Web Tools API server 130 receives the XML request and determines, based on the XML request, which API within the standard API modules 285 to call to process the request. Next, API server module 277 calls the applicable API in the standard API modules 285 to process the request, and sends an XML response to the e-commerce server 120 through network 110. E-commerce server 120 receives the XML response from the Web Tools API server 130 through network 110 (stage 340). The XML response may include one or more tags that specify a type for the response, and one or more tags that include the requested information. The format of an XML response for each API is described below in detail.

E-commerce server 120 determines, based on the XML response, whether an error occurred during the processing of the XML request by the Web Tools API server 130 (stage 350). If an error occurred ("Yes"), e-commerce server 120 generates an error status, based on the XML response, and sends it to client system 101 through network 110 (stage 370). Client system 101 may display the error status to the end-user through browser software module 210. Otherwise ("No"), e-commerce server 120 may generate a reply response, based on the XML response, and send it to client system 101 through network 110 (stage 360). Client system 101 may display the reply response to the end-user through browser software module 210 or user interface module 205. Alternatively, e-commerce server 120 sends the XML response received from Web Tools API server 130 to client system 101 through network 110.

FIGS. 4-17 describe API's that may be included in the Web Tools API suite. However, the API's are not limited to the API's described herein.

Figure 4:
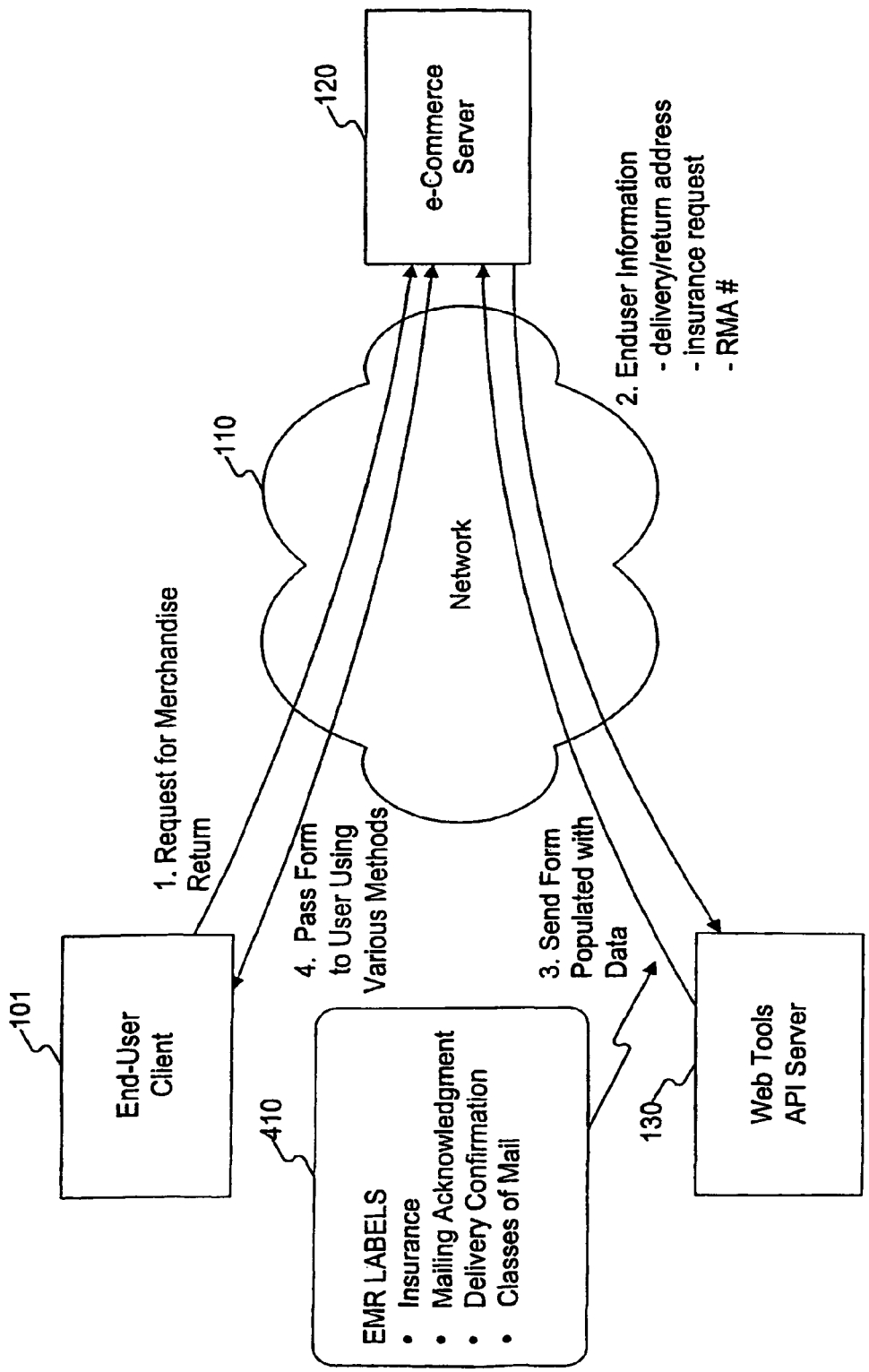
FIG. 4 is a block diagram showing data exchange occurring within a system for a merchandise return API.

FIG. 4 is a block diagram showing data exchange occurring within a system for a merchandise return API. Specifically, FIG. 4 shows an example of the flow of information for a merchandise return API, which is a merchandise return solution set up for e-commerce entity's that have customers who need to return a package that they've purchased. The merchandise return API has been specifically designed for e-commerce entities that elect to provide to their customers a prepaid postage return label. This API facilitates returns by allowing e-commerce entities to request and receive a merchandise return label for merchandise return, which the e-commerce entity can provide to its customers or end-users through any known distribution medium, such as email, regular mail, fax, etc.

As shown in FIG. 4, an end-user accesses an e-commerce server 120 over a network 110 through a client system 101 and makes a request to return a purchased item to a retailer. E-commerce server 120 may provide to the end-user, based on information supplied by the end-user, a list of items that were purchased. The end-user may select from the list one or more items to return. For purposes of this example, the end-user selects a single item. Thereafter, e-commerce server 120 may determine whether the end-user has permission to return the selected item, and if so, whether the item requires insurance for shipping. If the end-user has permission to return the selected item to the retailer, e-commerce server 120 generates an XML request based on the information supplied by the end-user and the selected item.

The request includes, for example, the name and address of the customer who purchased the item, name and address of the retailer who sold the item, service type, permit information, Postage Due Unit ("PDU") information, label image type, insurance value, package weight, return materials authorization ("RMA"), and mailing acknowledgement. The mailing acknowledgement is an optional service that provides a customer with an acknowledgement when an item is returned/delivered to a retailer. The e-commerce entity may be required to register with the USPS to receive a user ID and password to allow e-commerce server 120 to provide a valid user ID and password in each XML request.

For example, the XML request includes the following tags:

| Input | XML Tag | Values Allowed |
|---|---|---|
| Request | <EMRSV2.0Request... | Input tag exactly as presented. |
| User ID | ...USERID="userid"... | Use user ID provided with registration. |
| Password | ...PASSWORD="password"> | Use password provided with registration. |
| Customer's Name | <CustomerName> | Maximum characters allowed: 32 |
| Customer's Address | <CustomerAddress> | Maximum characters allowed: 24 |
| Customer's City | <CustomerCity> | Maximum characters allowed: 21 |
| Customer's State | <CustomerState> | Maximum characters allowed: 2 |
| Customer's ZIP Code ® | <CustomerZip5> | Input tag exactly as presented, not all caps. Maximum characters allowed: 5 |
| Retailer's Name | <RetailerName> | Maximum characters allowed: 32 |
| Retailer's Address | <RetailerAddress> | Maximum characters allowed: 32 |
| Post Office Permit Number | <PermitNumber> | Input permit number provided by your local post office. |
| City Issuing Post Office Permit | <PermitIssuingPOCity> | Maximum characters allowed: 15 |
| State Issuing Post Office Permit | <PermitIssuingPOState> | Maximum characters allowed: 2 |
| ZIP Code ® of Post Office Issuing Permit | <PermitIssuingPOZip5> | Input tag exactly as presented, not all caps. Maximum characters allowed: 5 |
| Postage Due Unit PO Box | <PDUPOBox> | Maximum characters allowed: 24 |
| Postage Due Unit City | <PDUCity> | Maximum characters allowed: 15 |
| Postage Due Unit State | <PDUState> | Maximum characters allowed: 2 |
| Postage Due Unit ZIP Code ® | <PDUZip5> | Input tag exactly as presented, not all caps. Maximum characters allowed: 5 |
| Postage Due Unit ZIP Code ® + 4 | <PDUZip4> | Input tag exactly as presented, not all caps. Maximum characters allowed: 4 |
| Service Type Requested | <ServiceType> | Valid entries are: "First Class," "Priority," "Parcel Post," "Bound Printed Matter," "Special Standard," or "Library Rate." |
| Delivery Confirmation ™ Service | <DeliveryConfirmation> | The valid values are "True" or "False" |
| Insurance Desired by Permit Holder | <InsuranceValue> | Enter numeric currency with dollars and cents (no dollar sign). If insurance is not required, leave value blank. A value of "0.00" will result in an error being returned. |
| Unique Parcel Identification Number | <MailingAckPackageID> | E-commerce entity assignable number. Maximum characters allowed: 24. Value entry is optional. Refer to "Mailing Acknowledgement" below. |
| Package Weight in Pounds | <WeightInPounds> | Value must be numeric. Maximum characters allowed: 2. |
| Package Weight in Ounces | <WeightinOunces> | Value must be numeric. Maximum characters allowed: 4. |

-continued

| Input | XML Tag | Values Allowed |
|---|---|---|
| Return Materials Authorization | <RMA> | Value entry is optional. |
| Label Image Type | <ImageType> | Either of two values allowed: "TIF" or "PDF" |

Thereafter, e-commerce server 120 sends the XML request to a Web Tools API server 130 through network 110 (stage 330). Web Tools API server 130 receives the XML request, and may call a merchandise return API module 285 to generate a merchandise return label based on the XML request. The merchandise return label may, for example, be in Portable Document Format ("PDF") or Tagged Image File ("TIF") format, which is determined by the value supplied in the Label Image Type tag in the XML request. Next, merchandise return API module 285 generates an XML response, which includes the merchandise return label. The merchandise return label may include forwarding information such as, address of the sender, address of a recipient, barcode, RMA, and an indication of pre-paid postage.

For example, the XML response includes the following tags:

| Output | XML Tag |
|---|---|
| Type of Response | <EMRSV2.0Response> |
| Zone | <Zone> |
| Image of Merchandise Return Label | <MerchandiseReturnLabel> |
| Insurance Cost | <InsuranceCost> |

However, if Web Tools API server 130 detects an error condition in processing a request from an e-commerce entity, the XML response includes information about the error. Thus, if Web Tools API server 130 detects an error condition, it may generate an XML response with tags that may have the following format:

```
<Error>
    <Number></Number>
    <Source></Source>
    <Description></Description>
    <HelpFile></HelpFile>
    <HelpContext></HelpContext>
</Error>
```

The number tag includes an error number generated by Web Tools API server 130. The source tag includes information about the source code component and API that generated the error condition on Web Tools API server 130. The description tag includes a description of the error.

After merchandise return API module 285 generates the XML response, Web Tools API server 130 sends the XML response to the e-commerce server 120 through network 110. E-commerce server 120 receives the XML response and extracts the merchandise return label. E-commerce server 120 may send the merchandise return label to client system 101 through network 110. Client system 101 may display the merchandise return label to the end-user. The end-user may then print the merchandise return label and attach it to the packaged item. Alternatively, e-commerce server 120 may fax the merchandise return label to the end-user, email the merchandise return label to the end-user, or mail it to the end-user.

Figure 4A:
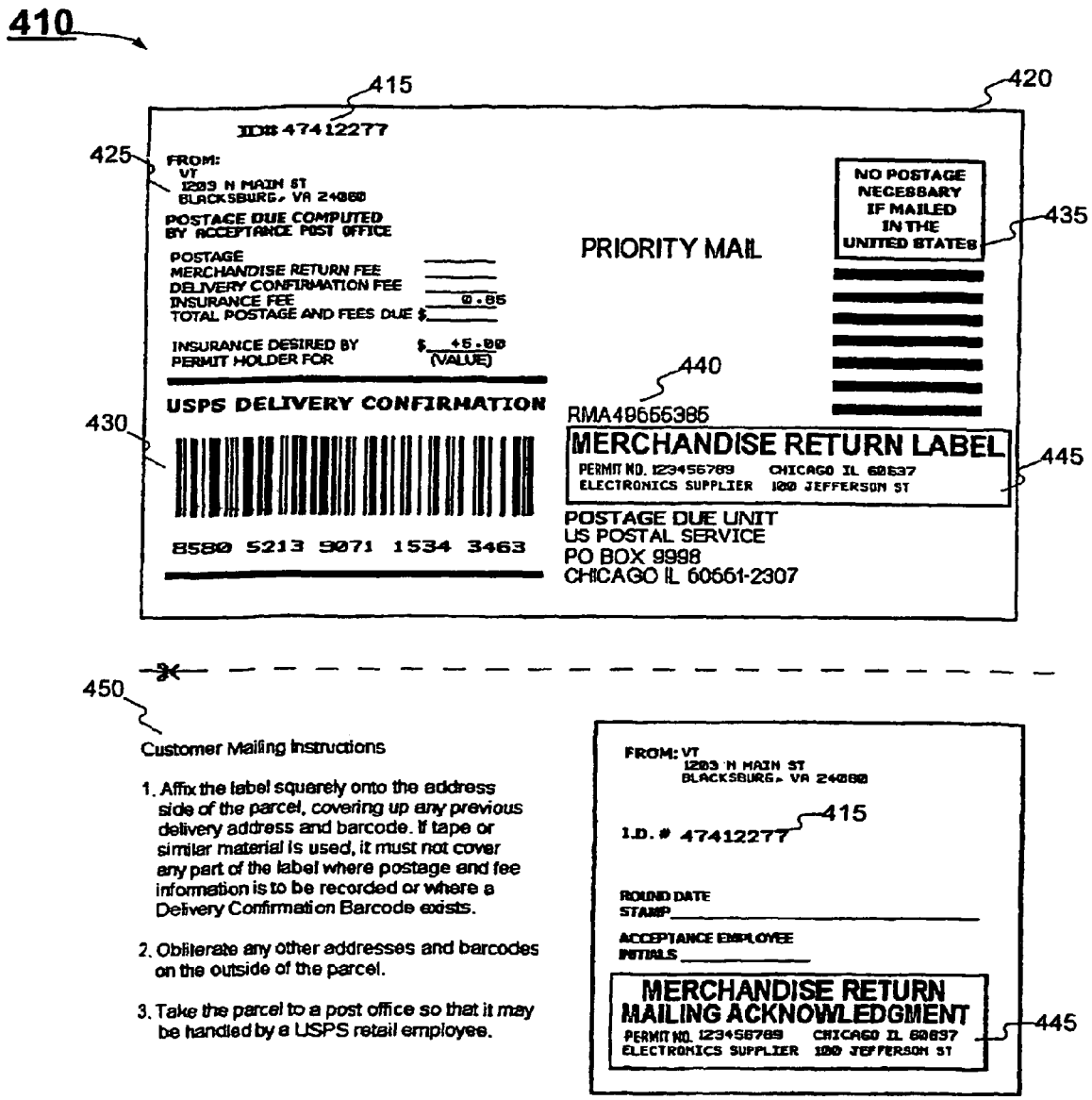
FIG. 4a is a diagram of a merchandise return label including a delivery confirmation barcode.

FIG. 4a is a diagram of a merchandise return label 410 generated by Web Tools API server 130. As shown in FIG. 4a, the merchandise return label 410 includes a return label 420 having forwarding information such as, address of a sender 425, address of a recipient 445, delivery confirmation barcode 430, RMA 440, and an indication of pre-paid postage 435. The postage for the return label is pre-paid by the e-commerce entity or the retailer, so the end-user is not required to apply postage to the return label. Optionally, the merchandise return label may include a mailing acknowledgment form 450 coupled to the return label 420 and a mailing acknowledgement identification number 415 is included on the mailing acknowledgment form 450 and the return label 420.

Figure 5:
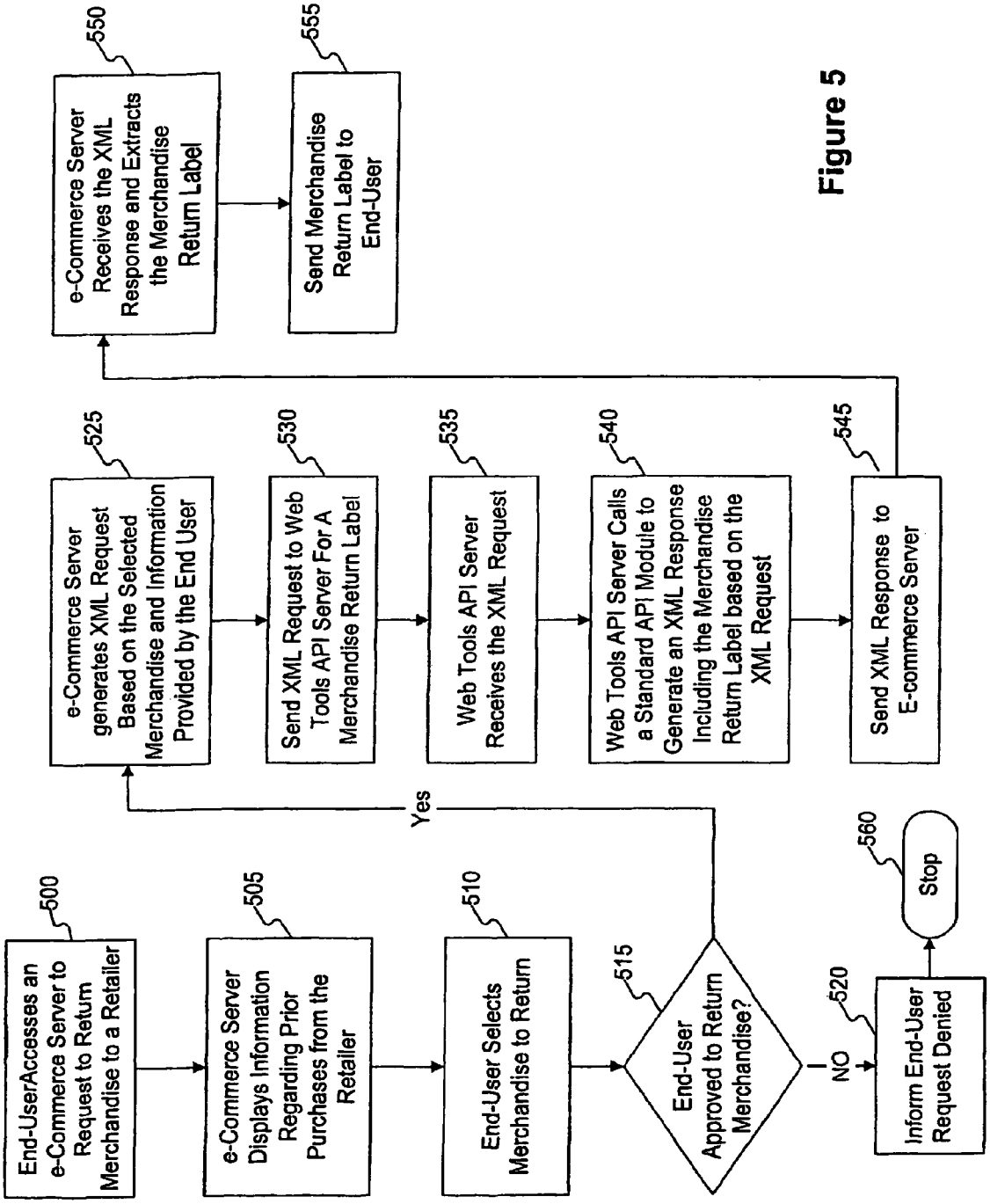
FIG. 5 is a flowchart showing a method for providing an electronic merchandise return label.

FIG. 5 is a flowchart showing a method for providing an electronic merchandise return label. As shown in FIG. 5, an end-user accesses an e-commerce server 120 through a client system 101, and makes a request to return merchandise to a retailer (stage 500). E-commerce server 120 may display to the end-user, based on information supplied by the end-user, a list of items of merchandise that were purchased from the retailer (stage 505). The end-user selects from the list an item of merchandise to return (stage 510). Thereafter, e-commerce server 120 determines whether the end-user has permission to return the selected merchandise by requesting approval from the retailer (stage 515). If the end-user does not have permission to return the merchandise to the retailer ("No"), e-commerce server 120 sends a message to the end-user informing her that her request is denied and the transaction stops (stage 520). Otherwise ("Yes"), the end-user has permission to return the merchandise to the retailer. E-commerce server 120 generates an XML request based on the information supplied by the end-user and the selected merchandise (stage 525).

Thereafter, e-commerce server 120 sends the XML request to a Web Tools API server 130 through network 110 (stage 530). Web Tools API server 130 receives the XML request (stage 535). Next, Web Tools API server 130 may call a merchandise return API module 285 to generate an XML response, which includes the merchandise return label (stage 540). Web Tools API server 130 sends the XML response to e-commerce server 120 through network 110 (stage 545). E-commerce server receives the XML response and extracts the merchandise return label (stage 550). E-commerce server 120 sends the merchandise return label to the end-user at client system 101 through network 110 (stage 555). Client system 101 displays the merchandise return label to the end-user. The end-user may then print the merchandise return label and attach it to the packaged item. Alternatively, e-commerce server 120 may fax the merchandise return label to the end-user, email the merchandise return label to the end-user, or mail it to the end-user.

In an alternate example, the e-commerce entity may request and receive a courtesy reply label instead of a merchandise return label. However, unlike the merchandise return labels, postage is not pre-paid. The courtesy reply label will be described below in detail.

Figure 6:
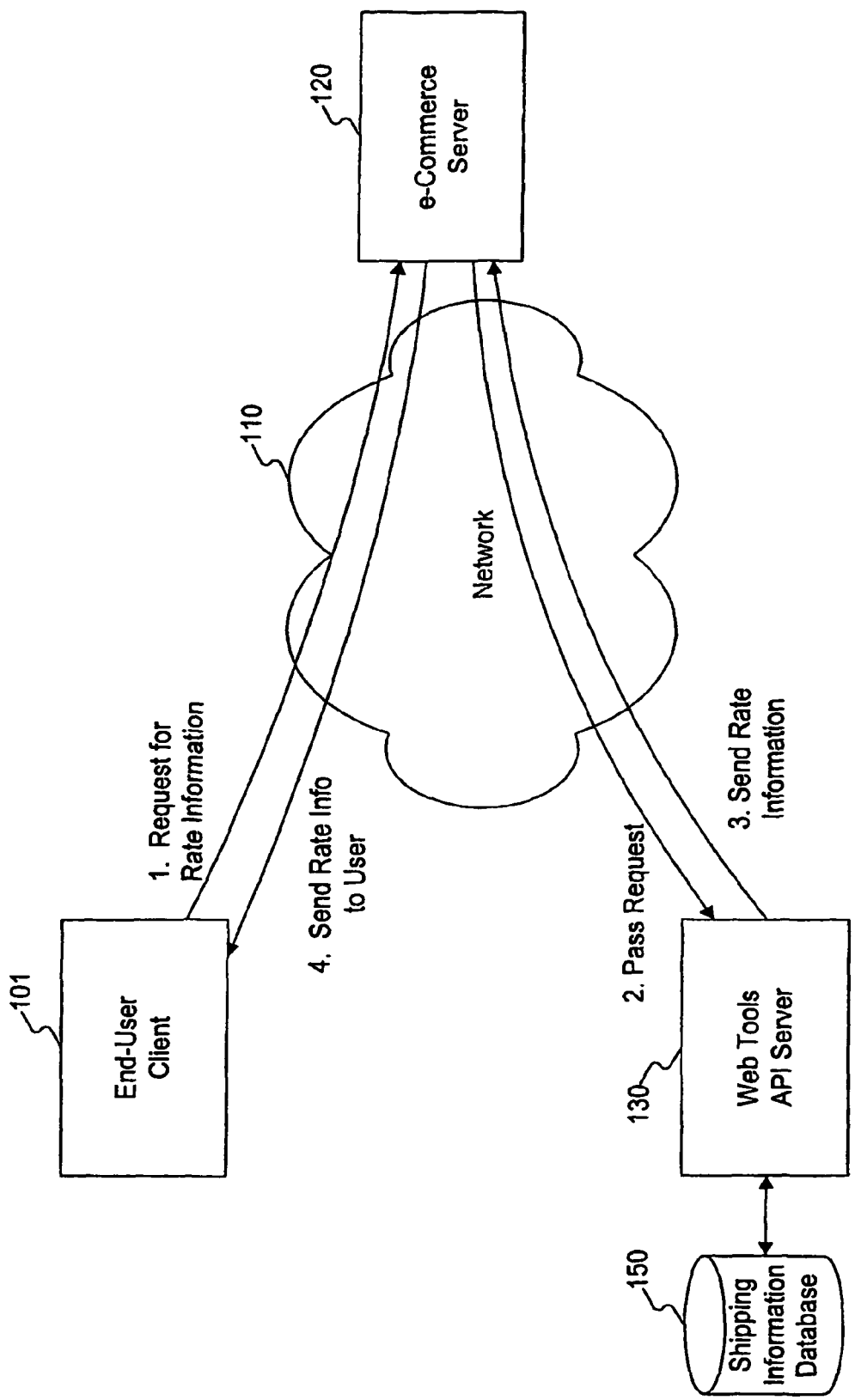
FIG. 6 is a block diagram showing data exchange occurring within a system for a rate calculation API.

FIG. 6 is a block diagram showing data exchange occurring within a system for a rate calculation API. The rate calculation API's provide access to domestic and/or international rates for various shipping rates such as Express Mail®, Priority Mail®, and Parcel Post™, to assist in making shipping decisions.

As shown in FIG. 6, an end-user accesses an e-commerce server 120 over a network 110 through a client system 101 and makes a request for rate information for shipping a package. In addition, the end-user supplies information about the package to be shipped, the point of destination, and in the case of domestic mailing, the point of origin. E-commerce server 120 generates an XML request for the rate information based on the information supplied by the end-user.

Example, the XML request for domestic rates includes the following tags:

| Input | XML Tag | Values Allowed |
|---|---|---|
| Type of Request | <RateRequest... | Input tag exactly as presented. |
| User ID | ...USERID="userid"... | Use user ID provided with registration. |
| Password | ...PASSWORD="password"> | Use password provided with registration. |
| Package ID Number | <Package ID="#"> | No restrictions on number or type of characters. |
| Type of Service Requested | <Service> | The service type must be one of the following: "Express," "Priority," or "Parcel." The API validated the entry to the service type. |
| Origination ZIP Code ® | <ZipOrigination> | Input tag exactly as presented. ZIP Codes ® must be valid. Maximum characters allowed: 5 |
| Destination ZIP Code ® | <ZipDestination> | Input tag exactly as presented. ZIP Codes ® must be valid. Maximum characters allowed: 5 |
| Package Weight in Pounds | <Pounds> | Value must be numeric. Package weight cannot exceed 70 pounds. Parcel Post ™ packages must weigh at least 1 pound. |
| Package Weight in Ounces | <Ounces> | Value must be numeric. Package weight cannot exceed 70 pounds. Parcel Post ™ packages must weigh at least 1 pound. |
| Shipping Container | <Container> | See below for valid entries. |
| Package Size | <Size> | Valid entries are: "Regular," "Large," and "Oversize." |
| Machinable | <Machinable> | The Machinable tag is required for Parcel Post ™ only. The value entered must be either "True" or "False" |

For example, the XML request for international rates includes the following tags:

| Input | XML Tag | Values Allowed |
|---|---|---|
| Type of Request | <IntlRateRequest... | Input tag exactly as presented. |
| User ID | ...USERID="userid"... | Use user ID provided with registration. |
| Password | ...PASSWORD="password"> | Use password provided with registration. |
| Package ID Number | <Package ID="#"> | No restriction on number or type of characters. |
| Weight of package (pounds) | <Pounds> | Value must be numeric. Package weight cannot exceed 70 pounds. Parcel Post ™ packages must weigh at least 1 pound. |
| Weight of package (ounces) | <Ounces> | Value must be numeric. Package weight cannot exceed 70 pounds. Parcel Post ™ packages must weigh at least 1 pound. |
| Type of Mail | <MailType> | The following are valid international mail types: "letters or letter packages" "other packages" |

-continued

| Input | XML Tag | Values Allowed |
|---|---|---|
| | | "postcards or aerogrammes" |
| | | "regular printed matter" |
| | | "books or sheet music" |
| | | "publishers' periodicals" |
| | | "matter for the blind" |
| Destination Country | <Country> | Entries must be from the USPS list of valid countries. |

Thereafter, e-commerce server 120 sends the XML request to a Web Tools API server 130 through network 110. Web Tools API server 130 receives the XML request and calls a rate calculation API module 285 to process the request. Rate calculation API module 285 queries a shipping information database 150 for the requested rate information based on the XML request. Next, rate calculation API module 285 generates an XML response based on results of information returned from the query. For example, if the request is for domestic rate information, the XML response includes the following tags:

| Output | XML Tag | Comments |
|---|---|---|
| Type of Response | <RateResponse> | |
| Package Identification Number | <Package ID="#"> | |
| Type of Service Required | <Service> | |
| Origination ZIP Code ® | <ZipOrigination> | |
| Destination ZIP Code ® | <ZipDestination> | |
| Package Weight (Pounds) | <Pounds> | |
| Package Weight (Ounces) | <Ounces> | |
| Shipping Container | <Container> | |
| Package Size | <Size> | |
| Postage Rate Charged | <Postage> | |
| Postal Zone | <Zone> | U.S. Postal Service Zones are used for Priority Mail ® packages over 5 lbs. |

For example, if the request is for international rate information, the XML response includes the following tags:

| Output | XML Tag | Comments |
|---|---|---|
| Type of Response | <IntlRateResponse> | |
| Package Identification Number | <Package ID="#"> | |
| Services Identification Number | <Service ID="#"> | For each package submitted, the available services for that package are returned with a separate identification number. |
| Weight of package (pounds) | <Pounds> | |
| Weight of package (ounces) | <Ounces> | |
| Type of Mail | <MailType> | |
| Destination Country | <Country> | |
| Postage Rate Charged | <Postage> | |
| Service Commitments | <SVCCommitments> | |
| Service Description | <SvcDescription> | |
| Maximum Dimensions of Package Allowed | <MaxDimensions> | |

-continued

| Output | XML Tag | Comments |
|---|---|---|
| Maximum Weight of Package Allowed | <MaxWeight> | |

After rate calculation API module 285 generates the XML response, Web Tools API server 130 sends the XML response to e-commerce server 120 through network 110. E-commerce server 120 receives the XML response and extracts the rate information. E-commerce server 120 sends the rate information to the end-user at client system 101 through network 110. Client system 101 may display the rate information to the end-user.

Figure 7:
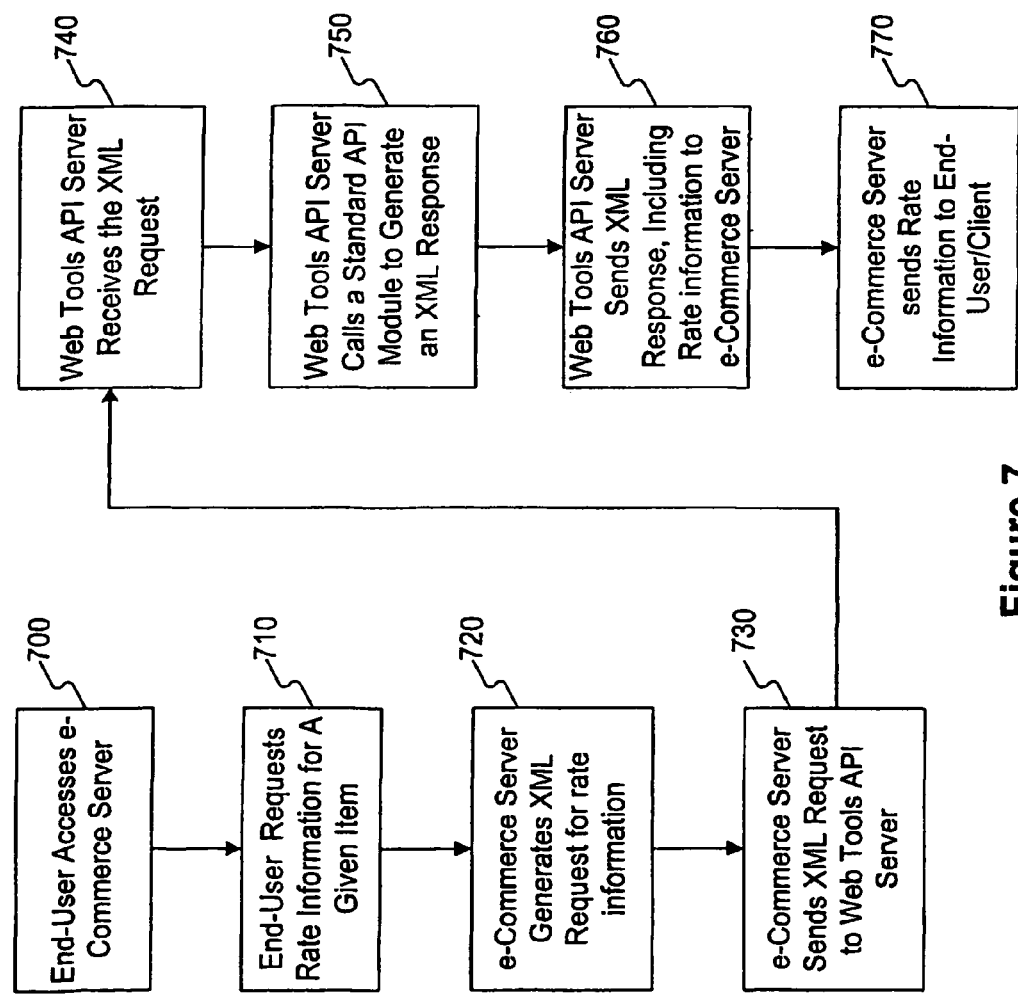
FIG. 7 is a flowchart showing a method for providing rate calculation information.

FIG. 7 is a flowchart showing a method for providing rate calculation information. As shown in FIG. 7, an end-user accesses an e-commerce server 120 through a client system 101 (stage 700). The end-user makes a request to e-commerce server 120 for rate information for shipping a package, and supplies information about the package to be shipped, the point of destination, and in the case of domestic mailing, the point of origin (stage 710). E-commerce server 120 generates an XML request for the rate information based on the information supplied by the end-user (stage 720). Thereafter, e-commerce server 120 sends the XML request to a Web Tools API server 130 through network 110 (stage 730).

Web Tools API server 130 receives the XML request (stage 740). Thereafter, Web Tools API server 130 calls a rate calculation API module 285 to process the request (stage 750). Rate calculation API module 285 queries a shipping information database 150 for the requested rate information based on the XML request. Next, rate calculation API module 285 generates an XML response based on results of information returned from the query. The XML response includes the requested rate information. Web Tools API server 130 sends the XML response to e-commerce server 120 through network 110 (stage 760). E-commerce server 120 receives the XML response and extracts the rate information. E-commerce server 120 sends the rate information to the end-user at client system 101 through network 110 (stage 760). Client system 101 may display the rate information to the end-user.

Figure 8:
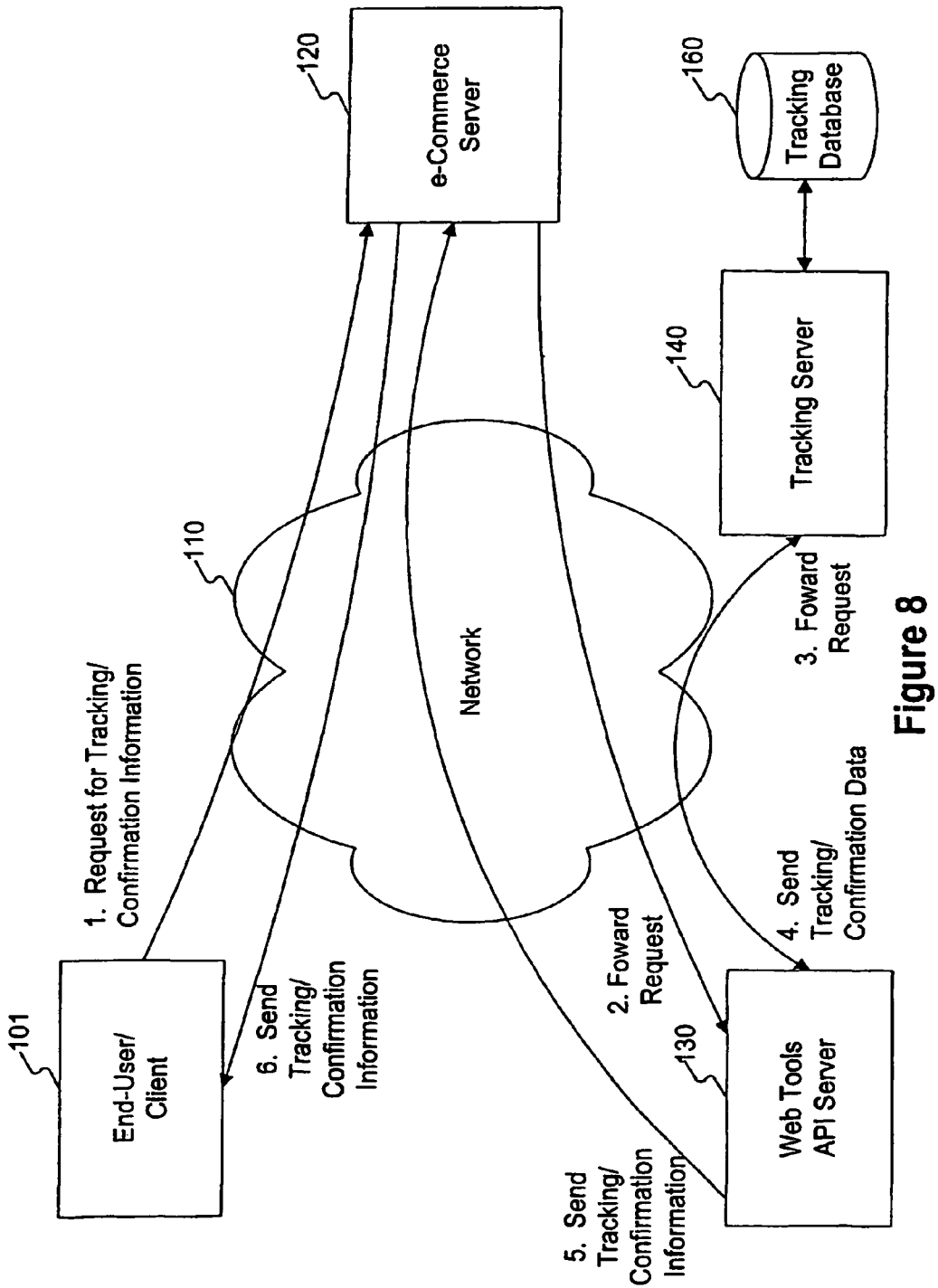
FIG. 8 is a block diagram showing data exchange occurring within a system for a tracking/confirmation API.

FIG. 8 is a block diagram showing data exchange occurring within a system for a tracking/confirmation API. The tracking/confirmation API provides for determining the delivery status of Priority Mail® and Parcel Post™ mail items and for Delivery Confirmations of mail items. It also provides for tracking Express Mail® shipments.

As shown in FIG. 8, an end-user accesses an e-commerce server 120 over a network 110 through a client system 101 and makes a request for tracking information for a package, and supplies information about the package such as a unique identification code or tracking ID. A "tracking ID" may also be referred to herein as a "package identification code."

E-commerce server 120 generates an XML request for the tracking/confirmation information based on the information supplied by the end-user.

For example, the XML request for tracking/confirmation information includes the following tags:

| Input | XML Tag | Values Allowed |
|---|---|---|
| Type of Request | <TrackRequest... | Input tag exactly as presented. |
| User ID | ...USERID="userid"... | Use user ID provided with registration. |
| Password | ...PASSWORD="password"> | Use password provided with registration. |
| Package Tracking ID Number | <TrackID ID="########"> | No restrictions on number or type of characters. |

Thereafter, E-commerce server 120 sends the XML request to a Web Tools API server 130 through network 110. Web Tools API server 130 receives the XML request and calls a tracking/confirmation API module 285 to process the request. Tracking/confirmation API module 285 sends the XML request to a tracking server 140 through network 110, thereby forwarding the tracking data to tracking server 140. Tracking server 140 queries one or more tracking databases 160 for the requested tracking information based on the XML request. Next, tracking server 140 retrieves the tracking information from tracking database 160 and sends it tracking/confirmation API module 285 through network 110. Tracking/confirmation API module 285 generates an XML response based on the tracking information received from tracking server 140.

For example, the XML response includes the following tags:

| Output | XML Tag |
|---|---|
| Type of Response | <TrackResponse> |
| Package Tracking ID Number | <TrackInfo ID="#######"> |
| Tracking Summary Information | <TrackSummary> |
| Tracking Detail Information | <TrackDetail> |

After tracking information API module 285 generates the XML response, Web Tools API server 130 sends the XML response to e-commerce server 120 through network 110. E-commerce server 120 receives the XML response and extracts the tracking information. E-commerce server 120 sends the tracking information to the end-user at client system 101 through network 110. Client system 101 may display the tracking information to the end-user.

Figure 9:
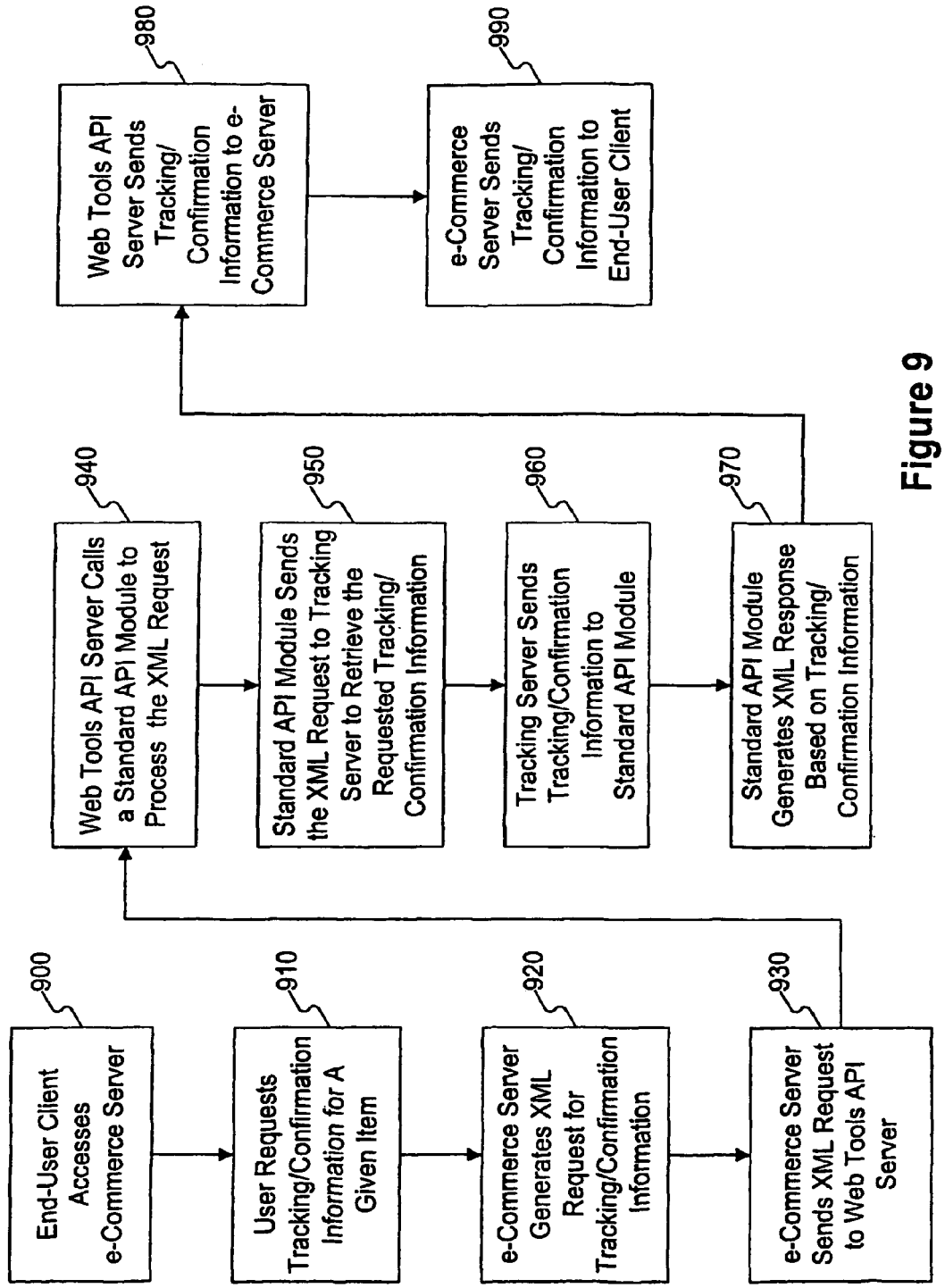
FIG. 9 is a flowchart showing a method for providing tracking/confirmation information.

FIG. 9 is a flowchart showing a method for providing tracking/confirmation information. As shown in FIG. 9, an end-user accesses an e-commerce server 120 over network 110 through a client system 101 (stage 900). The end-user makes a request to an e-commerce server 120 for tracking/confirmation information for a package, and supplies information about the package such as a unique identification code or tracking ID. (stage 910). E-commerce server 120 generates an XML request for the tracking/confirmation information based on the information supplied by the end-user (stage 920). Thereafter, e-commerce server 120 sends the XML request to the Web Tools API server 130 through network 110 (stage 930).

Web Tools API server 130 receives the XML request and calls a tracking/confirmation API module 285 (stage 940). Tracking/confirmation API module 285 sends the XML request to a tracking server 140 (stage 950). Tracking server 140 searches one or more tracking databases 160, and retrieves the requested tracking/confirmation information. Thereafter, tracking server 140 sends the tracking/confirmation information to tracking/confirmation API module 285 through network 110 (stage 960). Next, tracking/confirmation API module 285 generates an XML response based on the tracking/confirmation information received from tracking server 140 (stage 970). Web Tools API server 130 sends the XML response to e-commerce server 120 through network 110 (stage 980).

E-commerce server 120 receives the XML response and extracts the tracking/confirmation information. E-commerce server 120 sends the tracking/confirmation information to the end-user at client system 101 through network 110 (stage 990). Client system 101 may display the tracking/confirmation information to the end-user. Alternatively, Web Tools API server 130 sends the tracking/confirmation information instead of the XML response to e-commerce server 120 through network 110 (stage 980). Thereafter, e-commerce server 120 sends the tracking/confirmation information to the end-user at client system 101 through network 110 (stage 990).

Figure 10:
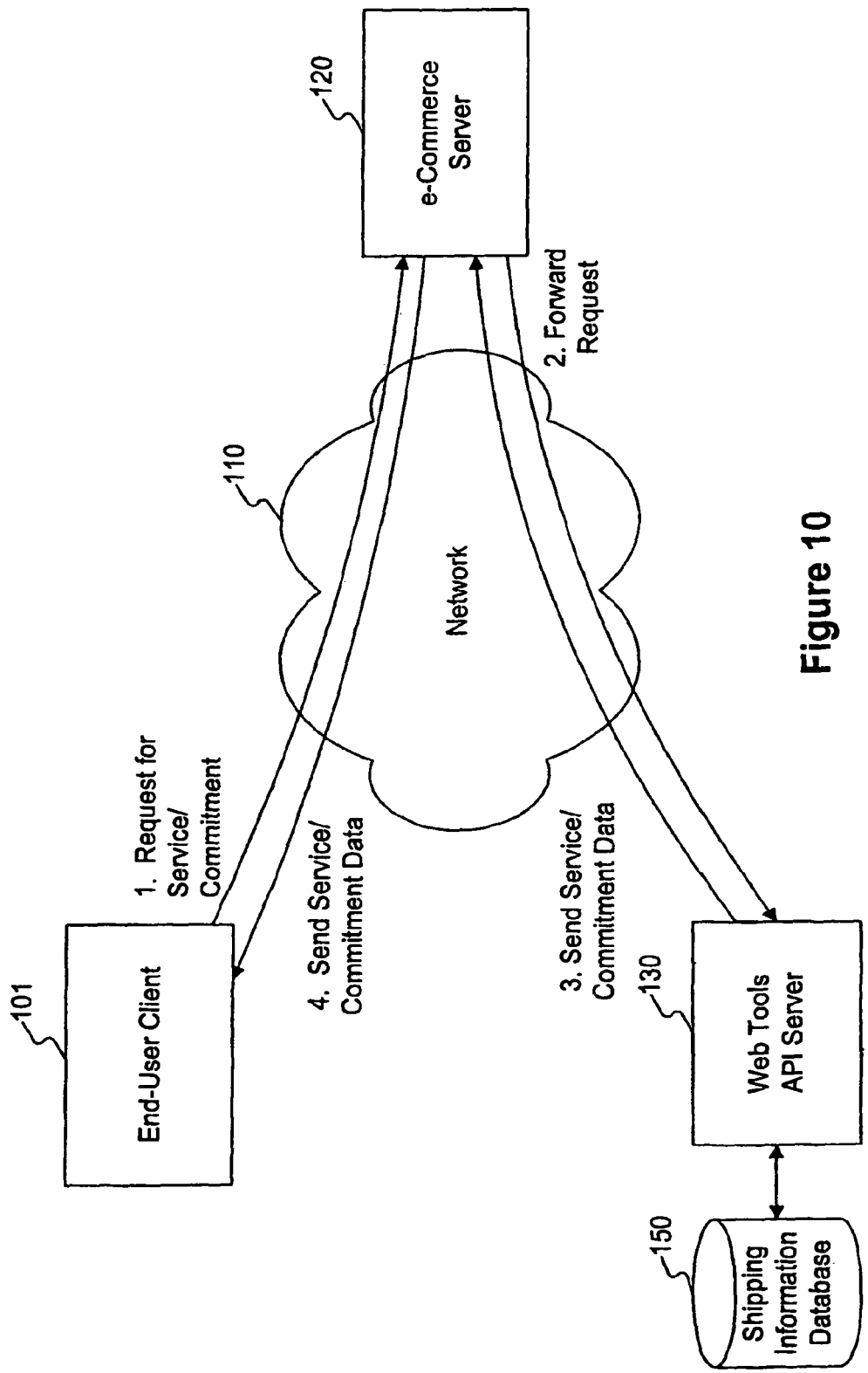
FIG. 10 is a block diagram showing data exchange occurring within a system for a service/commitment standards API.

FIG. 10 is a block diagram showing data exchange occurring within a system for a service/commitment standards API. The service/commitment standards API's may be used to determine the number of days (on average) it takes for a mail item to arrive at its destination. One such API is for Priority Mail® service standards, which returns the number of days it will take a Priority Mail® item to arrive at its destination. Another API is for standard mail service standards, which returns the number of days it will take a standard mail item to arrive at its destination. Yet another API is for Express Mail® service standards, which returns the service commitments for Monday-Friday, Saturday-Sunday, and Holiday delivery.

As shown in FIG. 10, an end-user accesses an e-commerce server 120 over a network 110 through a client system 101 and makes a request for service/commitment information for shipping a package from point A to point B, and supplies information about the package to be shipped. The information supplied by the end-user may include the point of origin (A), destination (B), and type of mail service, for example, Priority Mail. E-commerce server 120 generates an XML request for the service/commitment information based on the information supplied by the end-user.

For example, the XML request for Priority Mail® service standards includes the following tags:

| Input | XML Tag | Values Allowed |
|---|---|---|
| Type of Request | <PriorityMailRequest... | Input tag exactly as presented. |
| Username | ...USERID="userid"... | Use user ID provided with registration. |

| Input | XML Tag | Values Allowed |
| --- | --- | --- |
| Password | ...PASSWORD="password"> | Use password provided with registration. |
| Origination ZIP Code ® | <OriginZip> | Origination and destination ZIP Codes ® must be valid. Only the first 3 digits of the Zip Code ® are entered between the open tag and close tag. If a 1- or 2-digit ZIP Code ® is entered, it will be treated the same as a 3-digit zip prefixed with 2 or 1 zeros, respectively. If a 4- or 5-digit ZIP Code ® is entered, the last 1 or 2 digits will be ignored. |
| Destination ZIP Code ® | <DestinationZip> | Origination and destination ZIP Codes ® must be valid. Only the first 3 digits of the Zip Code ® are entered between the open tag and close tag. If a 1- or 2-digit ZIP Code ® is entered, it will be treated the same as a 3-digit zip prefixed with 2 or 1 zeros, respectively. If a 4- or 5-digit ZIP Code ® is entered, the last 1 or 2 digits will be ignored. |

For example, the XML request for Parcel Post™ service standards, which is a component of standard mail services, includes the following tags:

| Input | XML Tag | Values Allowed |
| --- | --- | --- |
| Type of Request | <StandardBRequest... | Input tag exactly as presented. |
| Username | ...USERID="userid"... | Use user ID provided with registration. |
| Password | ...PASSWORD="password"> | Use password provided with registration. |
| Origination ZIP Code ® | <OriginZip> | Origination and destination ZIP Codes ® must be valid. Only the first 3 digits of the Zip Code ® are entered between the open tag and close tag. If a 1- or 2-digit ZIP Code ® is entered, it will be treated the same as a 3-digit zip prefixed with 2 or 1 zeros, respectively. If a 4- or 5-digit ZIP Code ® is entered, the last 1 or 2 digits will be ignored. |
| Destination ZIP Code ® | <DestinationZip> | Origination and destination ZIP Codes ® must be valid. Only the first 3 digits of the Zip Code ® are entered between the open tag and close tag. If a 1- or 2-digit ZIP Code ® is entered, it will be treated the same as a 3-digit zip prefixed with 2 or 1 zeros, respectively. If a 4- or 5-digit ZIP Code ® is entered, the last 1 or 2 digits will be ignored. |

For example, the XML request for Express Mail® service standards includes the following tags:

| Input | XML Tag | Values Allowed |
| --- | --- | --- |
| Type of Request | <ExpressMailRequest... | Input tag exactly as presented. |
| User ID | ...USERID="userid"... | Use user ID provided with registration. |
| Password | ...PASSWORD="password"> | Use password provided with registration. |
| Origination ZIP Code ® | <OriginZip> | Origination and destination ZIP Codes ® must be valid. If a 1- to 4-digit ZIP Code ® is entered, it will be treated as if prefixed with 4 to 1 zeros, respectively. |
| Destination ZIP Code ® | <DestinationZip> | Origination and destination ZIP Codes ® must be valid. If a 1- to 4-digit ZIP Code ® is entered, it will be treated as if prefixed with 4 to 1 zeros, respectively. |

Thereafter, e-commerce server 120 sends the XML request to a Web Tools API server 130 through network 110. Web Tools API server 130 receives the XML request and calls a service/commitment API module 285 to process the request. Service/commitment API module 285 searches a shipping information database 150 for the requested service/commitment information based on the XML request. Next, service/commitment API module 285 generates an XML response based on retrieved service/commitment information.

For example, the XML response for Priority Mail® service standards includes the following tags:

| Output | XML Tag | Comments |
| --- | --- | --- |
| Response Type | <PriorityMailResponse> | |
| Origination ZIP Code ® | <OriginZip> | Only the first 3 digits of the ZIP Code ® are returned. |

-continued

| Output | XML Tag | Comments |
| --- | --- | --- |
| Destination ZIP Code ® | <DestinationZip> | Only the first 3 digits of the ZIP Code ® are returned. |
| Average number of days it will take the package to arrive | <Days> | |

For example, the XML response for Parcel Post™ service standards includes the following tags:

| Output | XML Tag | Comments |
| --- | --- | --- |
| Response Type | <StandardBResponse> | |
| Origination ZIP Code ® | <OriginZip> | Only the first 3 digits of the ZIP Code ® are returned. |
| Destination ZIP Code ® | <DestinationZip> | Only the first 3 digits of the ZIP Code ® are returned. |
| Average number of days it will take the package to arrive | <Days> | |

For example, the XML response for Express Mail® service standards includes the following tags:

| Output | XML Tag | Comments |
| --- | --- | --- |
| Response Type | <ExpressMailResponse> | |
| Origination ZIP Code ® | <OriginZip> | |
| Destination ZIP Code ® | <DestinationZip> | |
| Monday-Friday Service Commitment (12:00 pm, 3:00 pm, 2-day commitment) | <MonFriCommitment> | |
| Saturday-Sunday Service Commitment (12:00 pm, 3:00 pm, 2-day commitment, where applicable) | <SatSunCommitment> | Holiday service is the same as Sunday Service Commitment. |

After service/commitment API module 285 generates the XML response, Web Tools API server 130 sends the XML response to e-commerce server 120 through network 110. E-commerce server 120 receives the XML response and extracts the service/commitment information. E-commerce server 120 sends the service/commitment information to the end-user at client system 101 through network 110. Client system 101 may display the service/commitment information to the end-user. Alternatively, Web Tools API server 130 sends the service/commitment information instead of the XML response to e-commerce server 120 through network 110. Thereafter, e-commerce server 120 sends the service/commitment information to the end-user at client system 101 through network 110.

Figure 11:
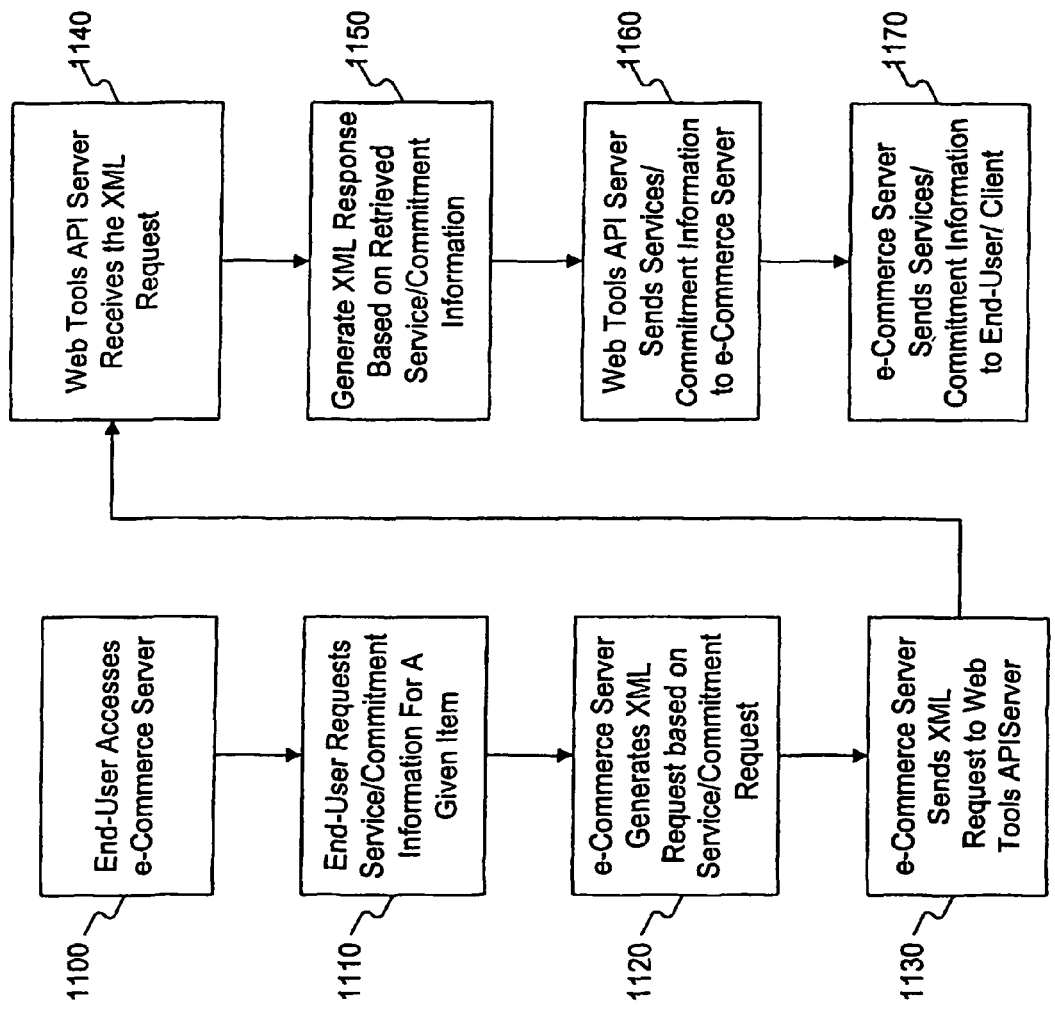
FIG. 11 is a flowchart showing a method for providing service/commitment standards information.

FIG. 11 is a flowchart showing a method for providing service/commitment standards information. As shown in FIG. 11, an end-user accesses an e-commerce server 120 through a client system 101 (stage 1100). The end-user makes a request to e-commerce server 120 for service/commitment information for shipping a package from point A to point B, and supplies information about the package to be shipped (stage 1110). The information supplied by the end-user may include the point of origin (A), destination (B), and type of mail service, for example, Priority Mail. E-commerce server 120 generates an XML request for the service/commitment information based on the information supplied by the end-user (stage 1120). Thereafter, e-commerce server 120 sends the XML request to Web Tools API server 130 through network 110 (stage 1130).

Web Tools API server 130 receives the XML request and calls a service/commitment API module 285 to process the request (stage 1140). Service/commitment API module 285 searches a shipping information database 150 for the requested service/commitment information based on the XML request and retrieves the requested service/commitment information. Next, service/commitment API module 285 generates an XML response based on retrieved service/commitment information (stage 1150). Web Tools API server 130 sends the XML response to e-commerce server 120 through network 110 (stage 1160). E-commerce server receives the XML response and extracts the service/commitment information. E-commerce server 120 sends the service/commitment information to the end-user at client system 101 through network 110 (stage 1170). Client system 101 may display the service/commitment information to the end-user. Alternatively, Web Tools API server 130 sends the service/commitment information instead of the XML response to e-commerce server 120 through network 110 (stage 1160). Thereafter, e-commerce server 120 sends the service/commitment information to the end-user at client system 101 through network 110 (stage 1170).

Figure 12:
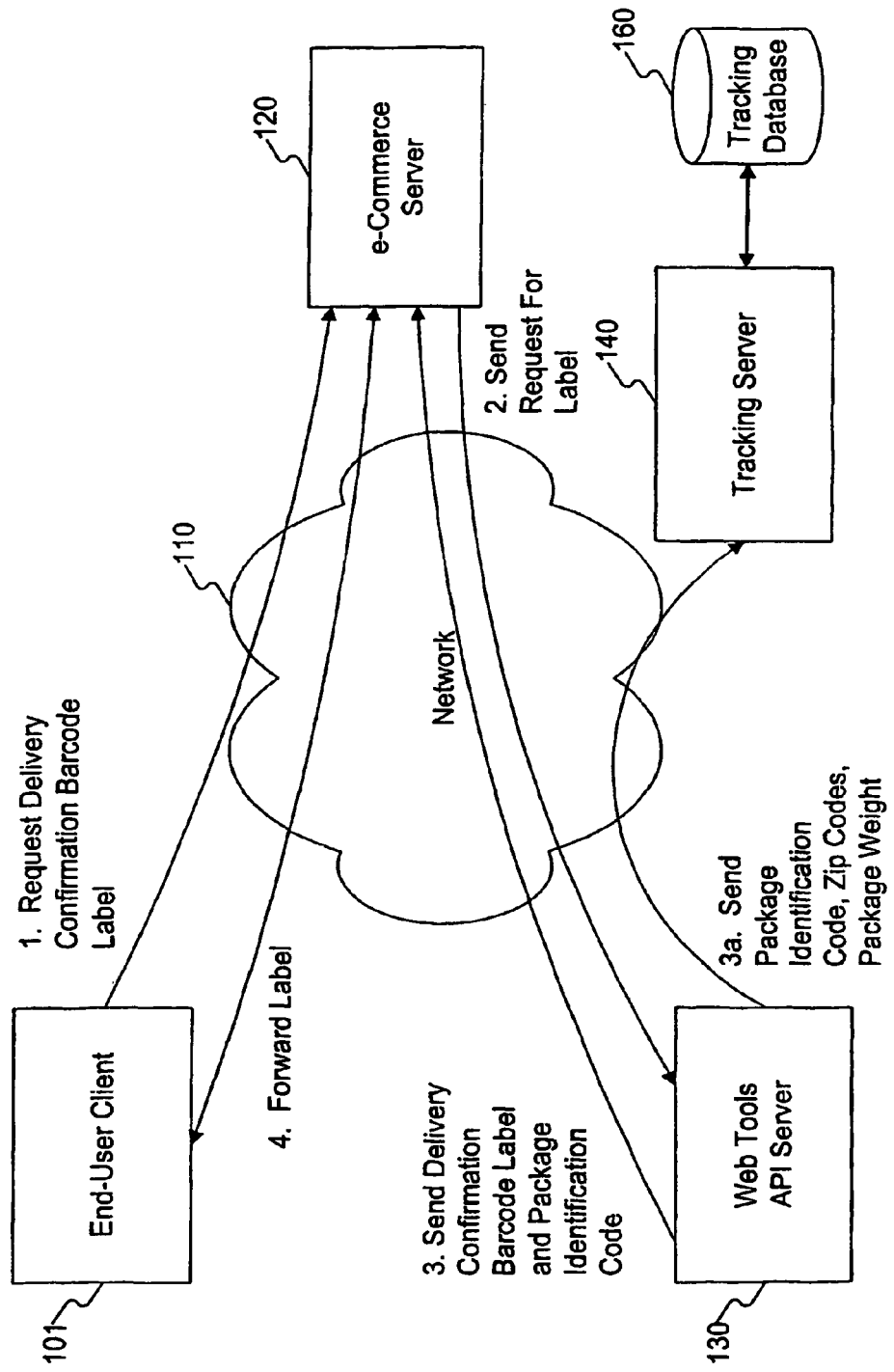
FIG. 12 is a block diagram showing data exchange occurring within a system for a delivery confirmation service API.

FIG. 12 is a block diagram showing data exchange occurring within a system for a delivery confirmation service API. A delivery confirmation service API provides information about the delivery status of Priority Mail® and Standard B packages, including the date, time, and ZIP Code® of delivery, as well as attempted deliveries, forwarding, and returns. This API may also provide a Delivery Confirmation™ label for Priority Mail® and Standard B, which includes Parcel Post™, Bound Printed Matter, Special. Standard, and Library Rate. The label returned by the API may be printed by the sender of a mail item such as a package, and attached to the package. Standard B may be referred to as "Package Services.". Special Standard may be referred to as "Media Mail." Library Rate may be referred to as "Library Mail."

This API provides for an end-user to request and receive a delivery confirmation barcode label for placement on either a Priority Mail® or a Standard B-mail item. An end-user may obtain, at no charge, a delivery confirmation barcode label and a package identification code ("PIC"). The PIC is a unique identifier associated with a delivery confirmation barcode. The delivery confirmation barcode allows a sender and a recipient of a Priority Mail® or a Standard B-mail item, such as a package to obtain delivery confirmation information about the package's delivery based on the PIC. As the package travels through a mail stream such as that provided by the USPS, the delivery confirmation barcode is scanned and the scanned information is stored in one or more tracking databases. Upon delivery of the package, the delivery confirmation barcode is scanned again, and the scanned information is stored in one of the tracking databases.

As shown in FIG. 12, an end-user accesses an e-commerce server 120 over a network 110 through a client system 101 and makes a request for a delivery confirmation barcode label, and supplies information about the package on which the delivery confirmation barcode label will be placed. The information supplied by the end-user may include information about the sender, receiver, package weight, mail service type, label image type, etc. The mail service type specifies, for example, either Priority Mail® or Standard B-mail. The label image type specifies the format of the graphic image of the delivery confirmation barcode label. The label option indicates the type of information that is to be included in the label. E-commerce server 120 generates an XML request for the delivery confirmation barcode label based on the information supplied by the end-user.

For example, the XML request for a delivery confirmation barcode label includes the following tags:

| Input | XML Tag | Values Allowed |
|---|---|---|
| Type of Request | <DeliveryConfirmationV2.0Request... | Input tag exactly as presented. |
| User ID | ...USERID="userid"... | Use user ID provided with registration. |
| Password | ...PASSWORD="password"> | Use password provided with registration. |
| Label Option | <Option> | Either of two values allowed: "1" for Label Option #1 or "2" for Label Option #2. For Label Option #1, a graphic image is returned that will include a barcode, PIC number, return name and address, and delivery name and address. For Label Option #2, a graphic image is returned that will include a barcode and PIC number without the return and delivery name and address. |
| Printer Definition | <ImageParameters> | This tag is for future use. The tag is required, but there are no values to enter. |
| Name of Sender | <FromName> | Maximum characters allowed: 32 |
| Company Name | <FromFirm> | This tag is required but the value is optional. Maximum characters allowed: 32 |
| From Address Line 1 | <FromAddress1> | Use this tag for an apartment or suite number. This tag is required but the value is optional. Maximum characters allowed: 32 |
| From Address Line 2 | <FromAddress2> | Maximum characters allowed: 32 |
| From City | <FromCity> | Maximum characters allowed: 21 |
| From State | <FromState> | Maximum characters allowed: 2 |
| From ZIP Code ® | <FromZip5> | Input tag exactly as presented, not all caps. Maximum characters allowed: 5 |
| From ZIP Code ® + 4 | <FromZip4> | Input tag exactly as presented, not all caps. This tag is required but the value is optional. Maximum characters allowed: 4 |
| Name of Recipient | <ToName> | Maximum characters allowed: 38 |
| Company Name | <ToFirm> | This tag is required but the value is optional. Maximum characters allowed: 38 |
| To Address Line 1 | <ToAddress1> | Use this tag for an apartment or suite number. This tag is required but the value is optional. Maximum characters allowed: 38 |
| To Address Line 2 | <ToAddress2> | Maximum characters allowed: 38 |
| To City | <ToCity> | Maximum characters allowed: 21 |
| To State | <ToState> | Maximum characters allowed: 2 |

-continued

| Input | XML Tag | Values Allowed |
| --- | --- | --- |
| To ZIP Code ® | <ToZip5> | Input tag exactly as presented, not all caps. Maximum characters allowed: 5 |
| To ZIP Code ® + 4 | <ToZip4> | Input tag exactly as presented, not all caps. This tag is required but the value is optional. Maximum characters allowed: 4 |
| Package Weight | <WeightinOunces> | Value must be numeric. |
| Mail Service Type | <ServiceType> | Either of two values are allowed "Priority" for Priority Mail ® or "StandardB" for Parcel Post ™, Bound Printed Matter, Special Standard, or Library Rate. |
| Label Image Type | <ImageType> | Either of two values allowed: "TIF" or "PDF" |

Thereafter, e-commerce server 120 sends the XML request to a Web Tools API server 130 through network 110. Web Tools API server 130 receives the XML request and calls a delivery confirmation service API module 285 to generate the requested delivery confirmation barcode label and to associate a PIC with the delivery confirmation barcode. Delivery confirmation service API module 285 sends the PIC and other information such as the zip codes and package weight, to a tracking server 140, where the PIC and other information is stored in a tracking database 160. In addition, delivery confirmation service API module 285 generates an XML response based on the delivery confirmation barcode label and the PIC.

For example, the XML response includes the following tags:

| Output | XML Tag |
| --- | --- |
| Type of Response | <DeliveryConfirmationV2.0Response> |
| Delivery Confirmation ™ ID Number (PIC #) | <DeliveryConfirmationNumber> |
| Delivery Confirmation ™ Label | <DeliveryConfirmationLabel> |

After delivery confirmation service API module 285 generates the XML response, Web Tools API server 130 sends the XML response to e-commerce server 120 through network 110. E-commerce server 120 receives the XML response and extracts the delivery confirmation barcode label and the PIC. Alternatively, Web Tools API server 130 may directly send the delivery confirmation barcode label and the PIC to e-commerce server 120 instead of generating and sending an XML response. E-commerce server 120 sends the delivery confirmation barcode label and the PIC to the end-user at client system 101 through network 110. Client system 101 may display the delivery confirmation barcode label and/or the PIC to the end-user.

Figure 13:
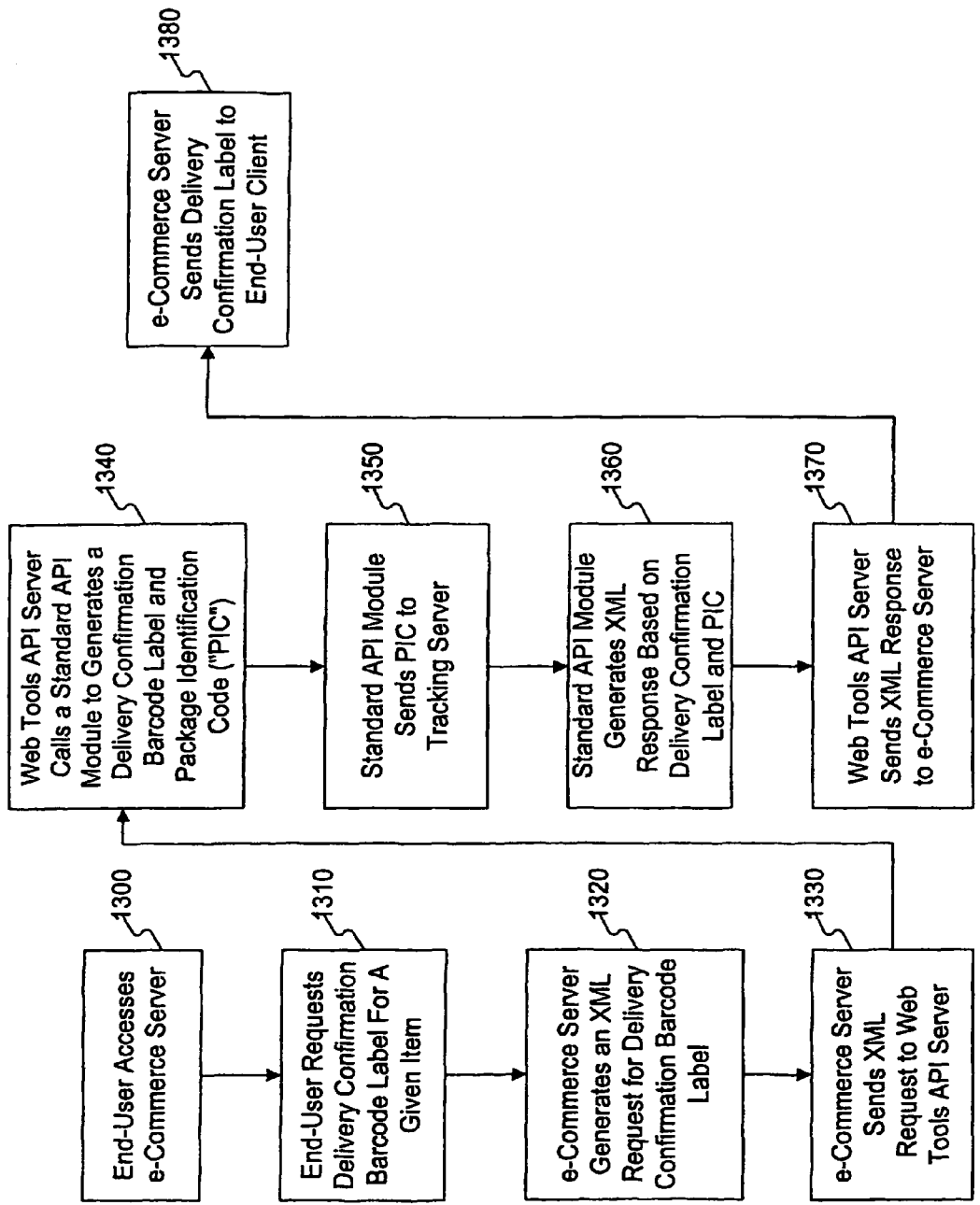
FIG. 13 is a flowchart showing a method for providing a delivery confirmation label.

FIG. 13 is a flowchart showing a method for providing a delivery confirmation label. As shown in FIG. 13, an end-user accesses an e-commerce server 120 through a client system 101 (stage 1300). The end-user makes a request to e-commerce server 120 for a delivery confirmation barcode label, and supplies information about the package on which the delivery confirmation barcode label will be placed (stage 1310). The information supplied by the end-user may include information about the sender, receiver, package weight, mail service type, label image type, etc. E-commerce server 120 generates an XML request for the delivery confirmation barcode label based on the information supplied by the end-user (stage 1320). Thereafter, e-commerce server 120 sends the XML request to a Web Tools API server 130 through network 110 (stage 1330).

Web Tools API server 130 receives the XML request and calls a delivery confirmation service API module 285 to process the request. Delivery confirmation service API module 285 generates the requested delivery confirmation barcode label and associates a PIC with the delivery confirmation barcode (stage 1340). Delivery confirmation service API module 285 sends the PIC and other information such as the zip codes and package weight, to a tracking server 140, where the PIC and other information is stored in a tracking database 160 (stage 1350). In addition, delivery confirmation service API module 285 generates an XML response based on the delivery confirmation barcode label and the PIC (stage 1360). Next, Web Tools API server 130 sends the XML response to e-commerce server 120 through network 110 (stage 1370).

E-commerce server 120 receives the XML response and extracts the delivery confirmation barcode label and the PIC (stage 1380). E-commerce server 120 sends delivery confirmation barcode label and the PIC to the end-user at client system 101 through network 110 (stage 990). Client system 101 may display the delivery confirmation barcode label and/or the PIC to the end-user. Alternatively, Web Tools API server 130 sends the delivery confirmation barcode label and the PIC instead of the XML response to e-commerce server 120 through network 110 (stage 1370). Thereafter, e-commerce server 120 sends the delivery confirmation barcode label and the PIC to the end-user at client system 101 through network 110 (stage 1380).

Figure 14:
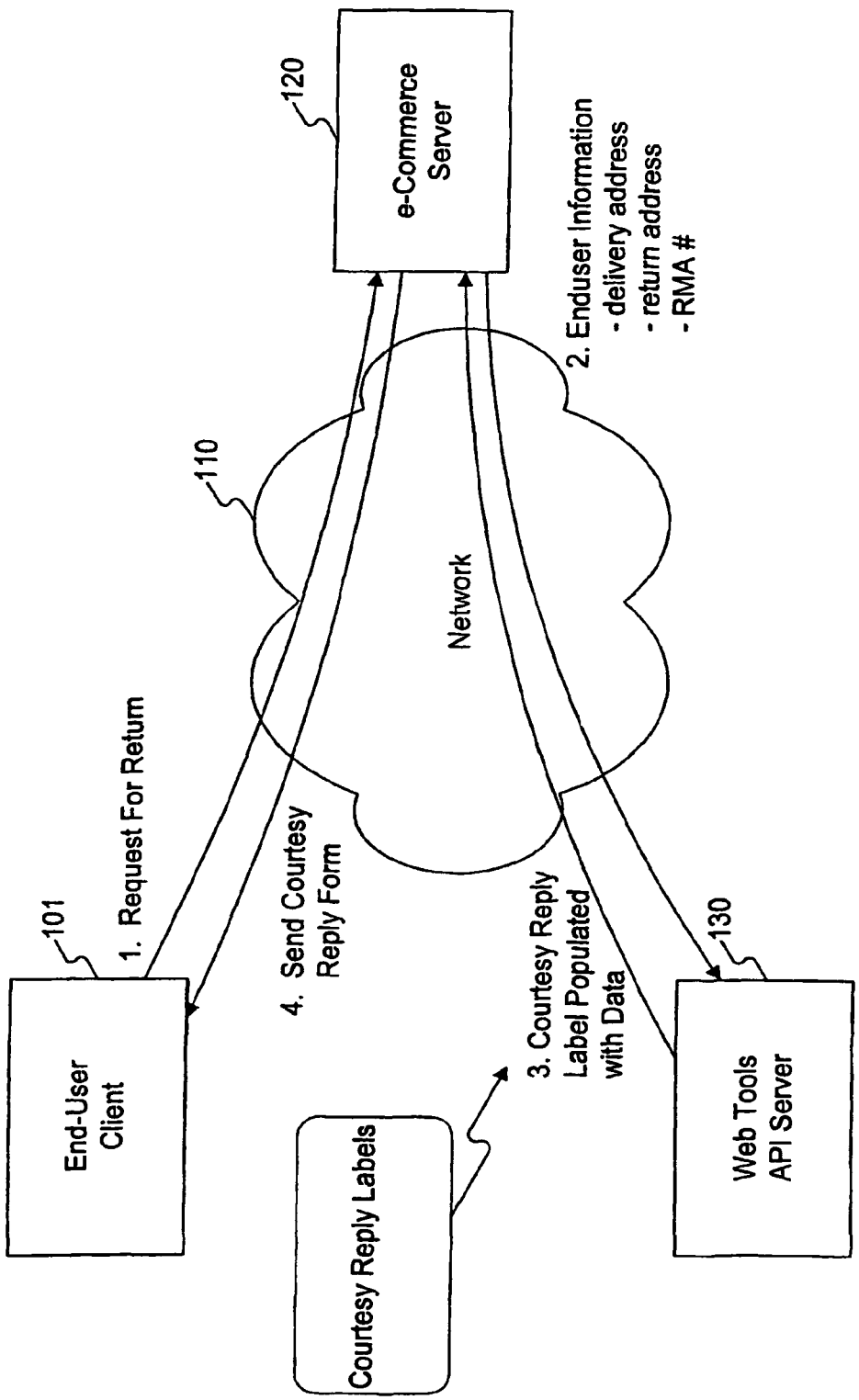
FIG. 14 is a block diagram showing data exchange occurring within a system for a courtesy reply label API.

FIG. 14 is a block diagram showing data exchange occurring within a system for a courtesy reply label API. The courtesy reply label API has been specifically designed for e-commerce entities that elect to have their customers pay the postage on a return item, but still wish to provide a convenient return label. This API facilitates returns by allowing e-commerce entities to request and receive a courtesy reply label for merchandise return, which the e-commerce entity can provide to its customers or end-users through any known distribution medium, such as email, regular mail, fax, etc.

As shown in FIG. 14, an end-user accesses an e-commerce server 120 over a network 110 through a client system 101 and makes a request to return a purchased item to a retailer. E-commerce server 120 may provide to the end-user, based on information supplied by the end-user, a list of items that were purchased. The end-user may select from the list one or more items to return. For purposes of this example, the end-user selects a single item. Thereafter, e-commerce server 120 determines whether the end-user has permission to return the selected item, and if so, whether the item requires insurance for shipping. If the end-user has permission to return the selected item to the retailer, e-commerce server 120 generates an XML request based on the information supplied by the end-user and the selected item.

The request includes, for example, the name and address of the customer who purchased the item, name and address of the retailer who sold the item, service type, permit information, PDU information, label image type, insurance value, package weight, and RMA.

For example, the XML request a courtesy reply label includes the following tags:

| Input | XML Tag | Values Allowed |
|---|---|---|
| Type of Request | <CourtesyLabelRequest... | Input tag exactly as presented. |
| User ID | ...USERID="userid"... | Use user ID provided with registration. |
| Password | ...PASSWORD="password"> | Use password provided with registration. |
| Customer's Name | <FromName> | Maximum characters allowed: 32 |
| Customer's Address | <FromAddress1> | Maximum characters allowed: 32 |
| Customer's Address | <FromAddress2> | Maximum characters allowed: 32 |
| Customer's City | <FromCity> | Maximum characters allowed: 21 |
| Customer's State | <FromState> | Maximum characters allowed: 2 |
| Customer's ZIP Code ® | <FromZip5> | Input tag exactly as presented, not all caps. Maximum characters allowed: 5 |
| Customer's ZIP Code ® | <FromZip4> | Input tag exactly as presented, not all caps. Maximum characters allowed: 5 |
| Retailer's Name | <ToName> | Maximum characters allowed: 32 |
| Retailer's Address | <ToAddress1> | Maximum characters allowed: 32 |
| Retailer's Address | <ToAddress2> | Maximum characters allowed: 32 |
| Retailer's City | <ToCity> | Maximum characters allowed: 21 |
| Retailer's State | <ToState> | Maximum characters allowed: 2 |
| Retailer's ZIP Code ® | <ToZip5> | Input tag exactly as presented, not all caps. Maximum characters allowed: 5 |
| Retailer's ZIP Code ® | <ToZip4> | Input tag exactly as presented, not all caps. Maximum characters allowed: 5 |
| Retailer Data | <Comment> | Value entry is optional. No restriction on number or type of characters. Any shipping or inventory information can be used with this tag. Any |
| Label Image Type | <ImageType> | information entered with this tag will appear on the label. Either of two values allowed: "TIF" or "PDF" |

Thereafter, e-commerce server 120 sends the XML request to a Web Tools API server 130 through network 110 (stage 330). Web Tools API server 130 receives the XML request and calls a courtesy reply label API module 285 to generate the courtesy reply label based on the XML request. The courtesy reply label may, for example, be in PDF or TIF format, which is determined by the value supplied in the Label Image Type tag. Next, courtesy reply label API module 285 generates an XML response, which includes the courtesy reply label. For example, the XML response includes the following tags:

| Output | XML Tag |
|---|---|
| Type of Response | <CourtesyLabelResponse> |
| Image of Courtesy Label | <CourtesyLabel> |

After courtesy reply label API module 285 generates the XML response, Web Tools API server 130 sends the XML response to e-commerce server 120 through network 110. E-commerce server 120 receives the XML response and extracts the courtesy reply label. E-commerce server 120 may send the courtesy reply label to client system 101 through network 110. Client system 101 may display the courtesy reply label to the end-user. The end-user may then print the courtesy reply label and attach it to the packaged item. Alternatively, e-commerce server 120 may fax the merchandise return label to the end-user, email the merchandise return label to the end-user, or mail it to the end-user.

Figure 15:
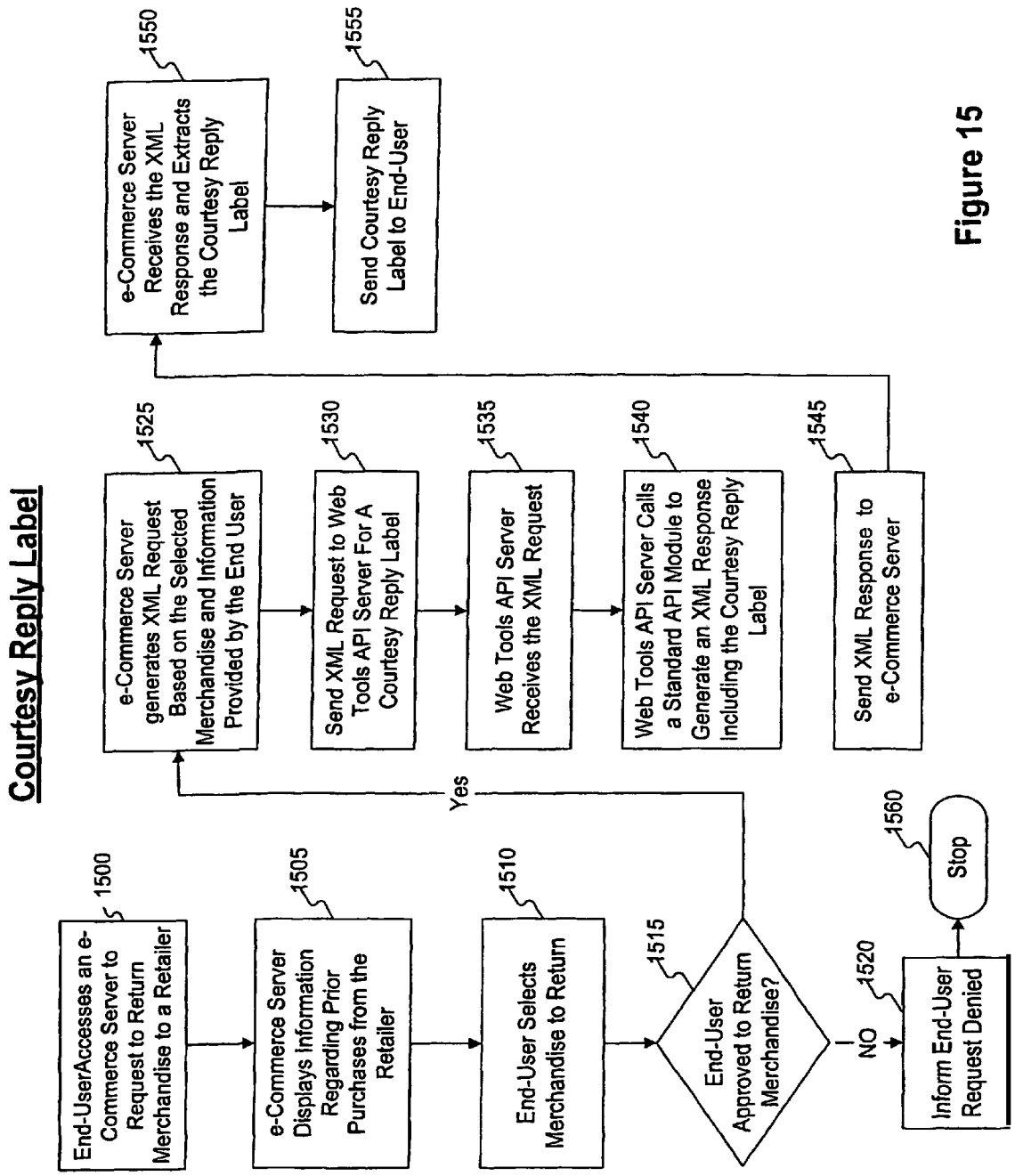
FIG. 15 is a flowchart showing a method for providing a courtesy reply label.

FIG. 15 is a flowchart showing a method for providing a courtesy reply label. As shown in FIG. 15, an end-user accesses an e-commerce server 120 through a client system 101, and makes a request to return merchandise to a retailer (stage 1500). E-commerce server 120 may display to the end-user, based on information supplied by the end-user, a list of items of merchandise that were purchased from the retailer (stage 1505). The end-user selects from the list an item of merchandise to return (stage 1510). Thereafter, e-commerce server 120 determines whether the end-user has permission to return the selected merchandise by requesting approval from the retailer (stage 1515). If the end-user does not have permission to return the merchandise to the retailer ("No"), e-commerce server 120 sends a message to the end-user informing her that her request is denied and the transaction stops (stage 1520). Otherwise ("Yes"), the end-user has permission to return the merchandise to the retailer. E-commerce server 120 generates an XML request based on the information supplied by the end-user and the selected merchandise (stage 1525).

Thereafter, e-commerce server 120 sends the XML request to a Web Tools API server 130 through network 110 (stage 1530). Web Tools API server 130 receives the XML request and calls a courtesy reply label API module 285 to process the request (stage 1535). Next, courtesy reply label API module 285 generates an XML response, which includes the courtesy reply label (stage 1540). Web Tools API server 130 sends the XML response to e-commerce server 120 through network 110 (stage 1545). E-commerce server 120 receives the XML response and extracts the courtesy reply label (stage 1550). E-commerce server 120 sends the courtesy reply label to the end-user at client system 101 through network 110 (stage 1555). Client system 101 displays the courtesy reply label to the end-user. The end-user may then print the courtesy reply label, attach it to the packaged item, and apply postage to the package. Alternatively, e-commerce server 120 may fax the courtesy reply label to the end-user, email the courtesy reply label to the end-user, or mail it to the end-user.

Figure 16:
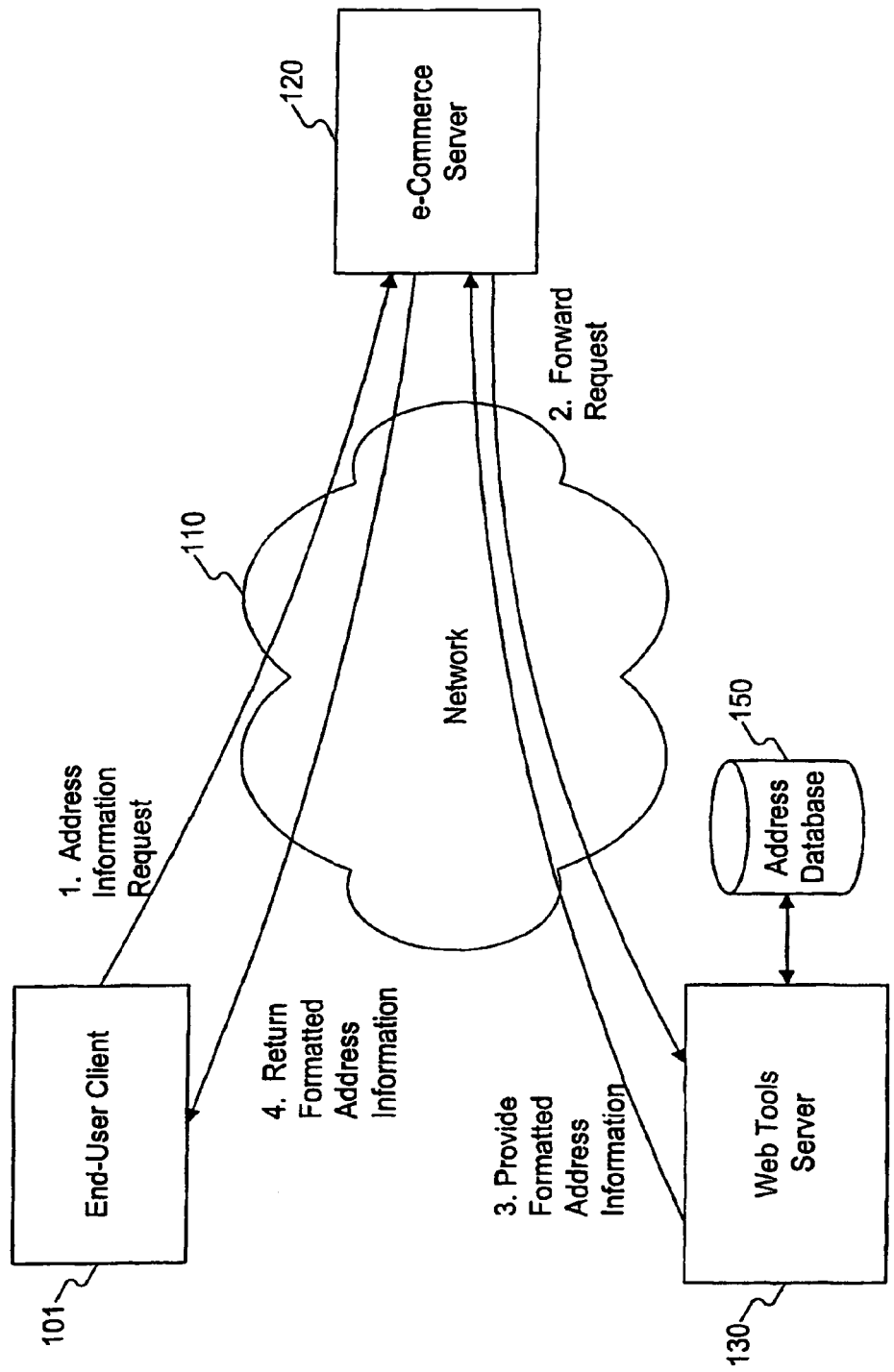
FIG. 16 is a block diagram showing data exchange occurring within a system for an address information service API.

FIG. 16 is a block diagram showing data exchange occurring within a system for an address information service API. The address information service API's provide access to standard address formats ("address information") and may include, but is not limited to, a city/state lookup API, ZIP code lookup API, and address standardization API. The ZIP code lookup API receives as input a given city and state code and returns a corresponding ZIP code. The city/state lookup API receives as input a given ZIP code and returns the city and state corresponding to the ZIP code. The address standardization API receives as input an address and corrects errors in the address, such as errors in street or city names and/or errors in the ZIP code, if any.

E-commerce entities needing to validate address information provided by an e-shopper or end-user may use one or more of the address information service API's to check the address information provided by the e-shopper or end-user. Alternatively, an end-user may request the e-commerce entity to provide a Zip code for a given city and state. The e-commerce entity may send a request to the ZIP code lookup API, which returns the requested ZIP code to the e-commerce entity.

As shown in FIG. 16, an end-user accesses an e-commerce server 120 over a network 110 through a client system 101 and makes a request for address information, such as the city and state information for a ZIP code specified by the end-user. E-commerce server 120 generates an XML request for the address information based on the information supplied by the end-user.

For example, the XML request for city/state lookup includes the following tags:

| Input | XML Tag |
|---|---|
| Type of Request | <CityStateLookupRequest... |
| User ID | ...USERID="userid"... |
| Password | ...PASSWORD="password"> |
| ZIP Code Lookup Number[1] | <ZipCode ID='#'> |
| ZIP Code of City or State | <Zip5> |

For example, the XML request for ZIP code lookup includes the following tags:

| Input | XML Tag |
|---|---|
| Type of Request | <ZipCodeLookupRequest... |
| User ID | ...USERID="userid"... |
| Password | ...PASSWORD="password"> |
| Address Lookup Number[1] | <Address ID='#'> |
| Name of Firm[2] | <FirmName> |
| Address Line 1[3] | <Address1> |
| Address Line 2[3] | <Address2> |
| City | <City> |
| State | <State> |

For example, the XML request for address standardization lookup includes the following tags:

| Input | XML Tag |
|---|---|
| Type of Request | <AddressValidateRequest... |
| User ID | ...USERID="userid"... |
| Password | ...PASSWORD="password"> |
| Address Verification Number[1] | <Address ID='#'> |
| Name of Firm[2] | <FirmName> |
| Address Line 1 | <Address1> |
| Address Line 2 | <Address2> |
| City | <City> |
| State | <State> |
| ZIP Code ® | <Zip5> |
| ZIP Code ® + 4 | <Zip4> |

Thereafter, e-commerce server 120 sends the XML request to a Web Tools API server 130 through network 110. Web Tools API server 130 receives the XML request and calls an address information service API module 285 to process the request. Address information service API module 285 searches a shipping information database 150 for the requested address information based on the XML request. Shipping information database 150 may include, for example, an address database. Next, address information service API module 285 generates an XML response based on retrieved address information.

For example, the XML response for city/state lookup includes the following tags:

| Output | XML Tag |
|---|---|
| Type of Response | <CityStateLookupResponse... |
| ZIP Code Lookup Number | <ZipCode ID='#'> |
| ZIP Code of City or State | <Zip5> |
| City for Requested ZIP Code ® | <City> |
| State for requested ZIP Code ® | <State> |

For example, the XML response for ZIP code lookup includes the following tags:

| Output | XML Tag |
|---|---|
| Type of Response | <ZipCodeLookupResponse> |
| Address ID Number | <Address ID='#'> |
| Name of Firm* | <FirmName> |
| Address Line 1* | <Address1> |
| Address Line 2* | <Address2> |
| City | <City> |
| State | <State> |
| ZIP Code | <Zip5> |
| ZIP Code + 4 | <Zip4> |

For example, the XML response for address standardization lookup includes the following tags:

| Output | XML Tag |
|---|---|
| Type of Response | <AddressValidateResponse> |
| Address Verification Number | <Address ID='#'> |
| Name of Firm* | <FirmName> |
| Address Line 1 | <Address1> |
| Address Line 2 | <Address2> |
| City | <City> |

| Output | XML Tag |
|---|---|
| State | <State> |
| ZIP Code ® | <Zip5> |
| ZIP Code ® + 4 | <Zip4> |

After address information service API module 285 generates the XML response, Web Tools API server 130 sends the XML response to the e-commerce server 120 through network 110. E-commerce server receives the XML response and extracts the address information. E-commerce server 120 sends the address information to the end-user at client system 101 through network 110. Client system 101 may display the address information to the end-user. Alternatively, Web Tools API server 130 sends the address information instead of the XML response to e-commerce server 120 through network 110. Thereafter, e-commerce server 120 sends the address information to the end-user at client system 101 through network 110.

Figure 17:
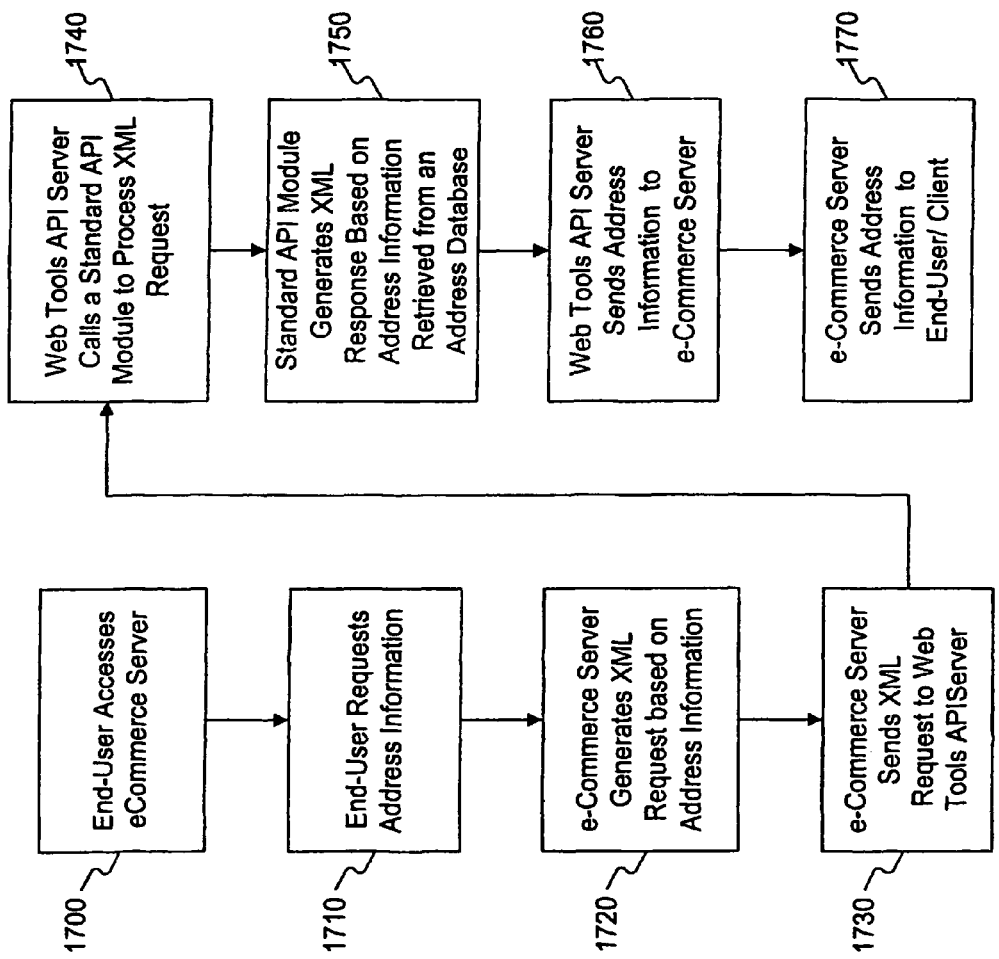
FIG. 17 is a flowchart showing a method for providing address information.

FIG. 17 is a flowchart showing a method for providing address information. As shown in FIG. 17, an end-user accesses an e-commerce server 126 through a client system 101 (stage 1700). The end-user makes a request to e-commerce server 120 for address information, such as the city and state information for a ZIP code specified by the end-user (stage 1710). E-commerce server 120 generates an XML request for the address information based on the information supplied by the end-user (stage 1720). Thereafter, e-commerce server 120 sends the XML request to Web Tools API server 130 through network 110 (stage 1730).

Web Tools API server 130 receives the XML request and calls an address information service API module 285 to process the request (stage 1740). Address information service API module 285 searches a shipping information database 150 for the requested address information based on the XML request and retrieves the requested address information. Shipping information database 150 may include, for example, an address database. Next, address information service API module 285 generates an XML response based on the retrieved address information (stage 1750). Web Tools API server sends the XML response to e-commerce server 120 through network 110 (stage 1760). E-commerce server receives the XML response and extracts the address information. E-commerce server 120 sends the address information to the end-user at client system 101 through network 110 (stage 1770). Client system 101 may display the address information to the end-user. Alternatively, Web Tools API server 130 sends the address information instead of the XML response to e-commerce server 120 through network 110 (stage 1160). Thereafter, e-commerce server 120 sends the address information to the end-user at client system 101 through network 110 (stage 1170).

In another example, an end-user accesses an e-commerce server 120 through a client system 101. The end-user provides a delivery address to e-commerce server 120 for the shipment of a purchased item. E-commerce server 120 generates an XML request for the validation of the address information. Thereafter, e-commerce server 120 sends the XML request to a Web Tools API server 130 through network 110.

Web Tools API server 130 receives the XML request and calls an address information service API module 285 to process the request. Address information service API module 285 searches a shipping information database 150 for address information based on the XML request, and using information from the address, corrects errors or omissions to the address information in the XML request. Shipping information database 150 may include, for example, an address database. Next, address information service API module 285 generates an XML response based on the address information and corrections to the address information.

Web Tools API server sends the XML response to the e-commerce server 120 through network 110. E-commerce server 120 receives the XML response and extracts the address information. E-commerce server 120 generates an XML request for a delivery confirmation label based on the address information. Thereafter, e-commerce server 120 sends the XML request to a Web Tools API server 130 over network 110.

Web Tools API server 130 receives the XML request and calls a delivery confirmation service API module 285 to generate the requested delivery confirmation barcode label and to associate a PIC with the delivery confirmation barcode. Delivery confirmation service API module 285 sends the PIC and other information such as the zip codes and package weight, to a tracking server 140, where the PIC and other information is stored in a tracking database 160. In addition, delivery confirmation service API module 285 generates an XML response based on the delivery confirmation barcode label and the PIC. Web Tools API server 130 sends the XML response to e-commerce server 120 through network 110. E-commerce server 120 may send the delivery label to the end-user using any known delivery method.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method for providing shipping information, comprising:
    sending, by an e-commerce server operated by an e-commerce entity, a registration request to an application programming interface (API) server operated by a shipping service provider, the API server comprising a plurality of API modules, each API module being dedicated to processing XML requests corresponding to a different one of a plurality of shipping information services, the registration request identifying at least one of the API modules;
    receiving, by the e-commerce server, the requested API module from the API server;
    integrating, by the e-commerce server, the requested API module with applications of the e-commerce server;
    receiving, by the e-commerce server, a request from an end-user for shipping information associated with one of the shipping information services;
    generating, by the e-commerce server, an extensible markup language (XML) request that specifies one of the API modules that is dedicated to processing requests corresponding to the requested shipping information service;
    sending the XML request to the specified API module of the application programming interface (API) server;
    receiving, from the specified API module, an XML response generated based on data included in the XML request, the XML response including the requested shipping information; and
    sending, from the e-commerce server, the XML response to the end-user.

2. The method of claim 1, wherein the XML request further comprises one or more tags that represent information relevant for processing the request for shipping information.

3. The method of claim 1, wherein the XML response comprises one or more tags that specify a type of the XML response and one or more tags that include the requested shipping information.

4. The method of claim 1, wherein the requested information is a shipping label.

5. The method of claim 1, wherein the requested information is a shipping rate.

6. The method of claim 1, wherein the requested information is a tracking and confirmation request.

7. The method of claim 1, wherein the requested information is a service and commitments standard request.

8. The method of claim 1, wherein the requested information is a delivery confirmation request.

9. The method of claim 1, wherein the requested information is a delivery confirmation label.

10. The method of claim 1, wherein the requested information is a courtesy reply label.

11. A system for providing shipping information, comprising:
  an application programming interface (API) server, operated by a shipping service provider, in communication with a network, the API server comprising a plurality of API modules, each API module being dedicated to processing XML requests corresponding to a different one of a plurality of shipping information services; and
  an e-commerce server, operated by an e-commerce entity, in communication with the network,
  wherein the e-commerce server is configured to:
    send a registration request to the API server, the registration request identifying at least one of the API modules;
    receive the requested API module from the API server;
    integrate the requested API module with applications of the e-commerce server;
    receive a request from an end-user for shipping information associated with one of the shipping information services,
    generate an extensible markup language (XML) request that specifies one of the API modules that is dedicated to processing requests corresponding to the requested shipping information service,
    send the XML request to the specified API module of the application programming interface (API) server, and
    receive, from the specified API module, an XML response generated based on data included in the XML request, the XML response including the requested shipping information.

12. The system of claim 11, the e-commerce server further sending the XML response to the end-user.

13. The system of claim 11, further comprising:
  a shipping information database in communication with the API server.

14. The system of claim 13, further comprising:
  a tracking server, in communication with the API server, for tracking a delivery status of items; and
  a tracking database in communication with the tracking server, the tracking database storing tracking information for the items.

15. The system of claim 3, the API server comprising a network interface module for sending or receiving shipping information to or from the shipping information database.

16. The system of claim 15, the network interface module further sending or receiving information from the tracking server over the network.

17. The system of claim 11, wherein the XML request further comprises one or more tags that represent information relevant for processing the request for shipping information.

18. The system of claim 11, wherein the XML response comprises one or more tags that specify a type of the XML response and one or more tags that include the requested shipping information.

19. The system of claim 11, wherein the requested information is a shipping label.

20. The system of claim 11, wherein the requested information is a shipping rate.

21. The system of claim 11, wherein the requested information is a tracking and confirmation request.

22. The system of claim 11, wherein the requested information is a service and commitments standard request.

23. The system of claim 11, wherein the requested information is a delivery confirmation request.

24. The system of claim 11, wherein the requested information is a delivery confirmation label.

25. The system of claim 11, wherein the requested information is a courtesy reply label.

26. A server, operated by an e-commerce entity, comprising:
  a processor;
  a memory storing instructions executable by the processor, the instructions cause the processor to:
    send, over a network, a registration request to an application programming interface (API) server, operated by a shipping service provider, the API server comprising a plurality of API modules, each API module being dedicated to processing XML requests corresponding to a different one of a plurality of shipping information services, and the registration request identifying at least one of the API modules;
    receive the requested API module from the API server;
    integrate the requested API module with applications of the e-commerce server;
    receive a request from an end-user for shipping information associated with one of the shipping information services,
    generate an extensible markup language (XML) request that specifies one of the API modules that is dedicated to processing requests corresponding to the requested shipping information service,
    send the XML request to the specified API module of the application programming interface (API) server, and
    receive, from the specified API module, an XML response generated based on data included in the XML request, the XML response including the requested shipping information.

* * * * *